(12) United States Patent
Perkins et al.

(10) Patent No.: US 9,140,717 B2
(45) Date of Patent: Sep. 22, 2015

(54) APPARATUS AND METHOD FOR IDENTIFYING AND ANALYZING THE FREE FLIGHT DYNAMICS OF A BODY

(75) Inventors: Noel Perkins, Ann Arbor, MI (US); Kevin King, Columbus, OH (US); Ryan Doss, Wyoming, MI (US)

(73) Assignee: The Regents of The University of Michigan, Ann Arbor, MI (US)

( * ) Notice: Subject to any disclaimer, the term of this patent is extended or adjusted under 35 U.S.C. 154(b) by 304 days.

(21) Appl. No.: 13/236,725

(22) Filed: Sep. 20, 2011

(65) Prior Publication Data

US 2013/0073247 A1     Mar. 21, 2013

(51) Int. Cl.
 G01P 15/00    (2006.01)
 G01P 3/44     (2006.01)
 G01C 21/16    (2006.01)
 A63B 24/00    (2006.01)

(52) U.S. Cl.
 CPC . *G01P 3/44* (2013.01); *G01C 21/16* (2013.01); *A63B 2024/0034* (2013.01); *A63B 2220/40* (2013.01)

(58) Field of Classification Search
 CPC ..... G01P 9/02; G01C 19/065; G01C 19/5776
 USPC ......................... 702/141, 145, 153
 See application file for complete search history.

(56) References Cited

U.S. PATENT DOCUMENTS

| | | | |
|---|---|---|---|
| 4,601,206 A | 7/1986 | Watson | |
| 4,759,219 A | 7/1988 | Cobb et al. | |
| 5,539,935 A | 7/1996 | Rush, III | |
| 5,548,999 A | 8/1996 | Kakizaki et al. | |
| 5,694,340 A * | 12/1997 | Kim | 702/141 |
| 6,073,086 A | 6/2000 | Marinelli | |
| 6,128,955 A | 10/2000 | Mimura | |
| 6,148,271 A * | 11/2000 | Marinelli | 702/141 |
| 6,151,563 A | 11/2000 | Marinelli | |
| 6,157,898 A | 12/2000 | Marinelli | |
| 6,195,261 B1 | 2/2001 | Babutzka et al. | |
| 6,301,964 B1 | 10/2001 | Fyfe et al. | |
| 6,725,719 B2 | 4/2004 | Cardarelli | |
| 6,836,744 B1 | 12/2004 | Asphahani et al. | |
| 7,021,140 B2 * | 4/2006 | Perkins | 73/493 |
| 7,234,351 B2 | 6/2007 | Perkins | |
| 7,237,446 B2 | 7/2007 | Chan et al. | |

(Continued)

FOREIGN PATENT DOCUMENTS

JP    2008038418 A    2/2008

OTHER PUBLICATIONS

Costello, Mark et al., Determining Angular Velocity and Angular Acceleration of Projectiles Using Triaxial Acceleration Measurements, Journal of Spacecraft and Rockets, Jan.-Feb. 2002, vol. 39, No. 1: p. 73-80.*

(Continued)

*Primary Examiner* — Timothy H Hwang
(74) *Attorney, Agent, or Firm* — Harness, Dickey & Pierce, P.L.C.

(57) ABSTRACT

An apparatus for analyzing free flight of a body including an inertial measurement unit having at least one accelerometer continuously measuring three orthogonal axes of acceleration and outputting data representative thereof and a processing unit operably receiving the data and determining three components of an angular velocity of the body during free flight.

6 Claims, 12 Drawing Sheets

(56) References Cited

U.S. PATENT DOCUMENTS

| | | | |
|---|---|---|---|
| 7,457,724 | B2 | 11/2008 | Vock et al. |
| 7,509,835 | B2 | 3/2009 | Beck |
| 7,536,909 | B2 | 5/2009 | Zhao et al. |
| 7,628,074 | B2 | 12/2009 | Vannucci et al. |
| 7,814,791 | B2 | 10/2010 | Andersson et al. |
| 7,849,740 | B2 | 12/2010 | Nichol |
| 7,907,838 | B2 | 3/2011 | Nasiri et al. |
| 7,938,004 | B1 | 5/2011 | Brunsch, Jr. et al. |
| 8,001,839 | B2* | 8/2011 | Sugihara et al. ............ 73/493 |
| 8,042,391 | B2 | 10/2011 | Ye |
| 8,156,806 | B1 | 4/2012 | Cardarelli |
| 8,186,217 | B2 | 5/2012 | Veltink |
| 8,209,147 | B2 | 6/2012 | Solinsky |
| 8,250,921 | B2 | 8/2012 | Nasiri et al. |
| 8,616,989 | B2 | 12/2013 | Bentley |
| 8,668,595 | B2 | 3/2014 | Boyd et al. |
| 2002/0040601 | A1 | 4/2002 | Fyfe et al. |
| 2002/0077189 | A1 | 6/2002 | Tuer et al. |
| 2003/0023192 | A1 | 1/2003 | Foxlin |
| 2003/0070483 | A1 | 4/2003 | Mueller |
| 2003/0149528 | A1 | 8/2003 | Lin |
| 2005/0081629 | A1 | 4/2005 | Hoshal |
| 2005/0143949 | A1 | 6/2005 | Hagstedt |
| 2006/0042382 | A1 | 3/2006 | DCamp et al. |
| 2006/0062382 | A1 | 3/2006 | Ronkainen |
| 2006/0161363 | A1 | 7/2006 | Shibasaki et al. |
| 2006/0185431 | A1 | 8/2006 | Birecki et al. |
| 2006/0185432 | A1 | 8/2006 | Weinberg |
| 2006/0230829 | A1 | 10/2006 | Byrd |
| 2006/0287085 | A1 | 12/2006 | Mao et al. |
| 2007/0039387 | A1 | 2/2007 | Jouanet et al. |
| 2007/0169551 | A1 | 7/2007 | Kelly |
| 2008/0176681 | A1 | 7/2008 | Donahoe |
| 2008/0196499 | A1 | 8/2008 | Li et al. |
| 2008/0255795 | A1* | 10/2008 | Shkolnikov ............ 702/141 |
| 2008/0285805 | A1 | 11/2008 | Luinge et al. |
| 2009/0048044 | A1 | 2/2009 | Oleson et al. |
| 2009/0255335 | A1 | 10/2009 | Fly et al. |
| 2009/0262074 | A1* | 10/2009 | Nasiri et al. ............ 345/158 |
| 2009/0325739 | A1 | 12/2009 | Gold |
| 2010/0030482 | A1 | 2/2010 | Li |
| 2010/0053331 | A1* | 3/2010 | Accurso ............ 348/157 |
| 2010/0089155 | A1 | 4/2010 | Sugihara et al. |
| 2010/0184563 | A1 | 7/2010 | Molyneux et al. |
| 2010/0211317 | A1 | 8/2010 | Kroepfl et al. |
| 2011/0077891 | A1* | 3/2011 | Koenig ............ 702/104 |
| 2011/0118065 | A1 | 5/2011 | Krysiak et al. |
| 2011/0215931 | A1 | 9/2011 | Callsen et al. |
| 2011/0313552 | A1* | 12/2011 | Davenport ............ 700/91 |
| 2012/0004882 | A1 | 1/2012 | Sheynblat |
| 2012/0078570 | A1* | 3/2012 | Rothkopf et al. ............ 702/141 |
| 2012/0271565 | A1 | 10/2012 | Berme et al. |
| 2012/0277015 | A1 | 11/2012 | Boyd et al. |
| 2012/0296601 | A1 | 11/2012 | Eatwell |
| 2013/0029791 | A1 | 1/2013 | Rose et al. |
| 2013/0068017 | A1 | 3/2013 | Perkins et al. |
| 2013/0073247 | A1 | 3/2013 | Perkins et al. |
| 2013/0073248 | A1 | 3/2013 | Perkins et al. |
| 2014/0045630 | A1 | 2/2014 | Perkins et al. |

OTHER PUBLICATIONS

Krishnan, V., Measurement of Angular Velocity and Linear Acceleration using Linear Accelerometers, Journal of the Franklin Institute, vol. 280, Issue 4, Oct. 1965, pp. 307-315.*

Qin Z, Baron L, Birglen L. Robust Design of Inertial Measurement Units Based on Accelerometers. ASME. J. Dyn. Sys., Meas., Control. 2009;131(3).*

Bisseling, R. et al., "Handling of Impact Forces in Inverse Dynamics", Journal of Biomechanics, vol. 39, Issue 13, 2006, pp. 2438-2444.

Alaways, L. and Hubbard, M., "Experimental determination of baseball spin and lift," Journal of Sports Sciences, (May 2001), vol. 19, No. 5, pp. 349-358.

Alaways, L., Mish, S. and Hubbard, M., "Identification of release conditions and aerodynamic forces in pitched-baseball trajectories," Journal of Applied Biomechanics, (Feb. 2001), vol. 17, No. 1, pp. 63-76.

Anderson, D., Perkins, N.C., and Richards, B., "Quantitative understanding of the fly casting stroke through measurements and robotic casting," (Jun. 2006), Sports Engineering, vol. 9, Issue 2, pp. 97-106.

Bahill, A.T., and Baldwin, D.G., "Describing baseball pitch movement with right-hand rules," Computers in Biology and Medicine, (Jul. 2007), vol. 37, No. 7, pp. 1001-1008.

Berkson, E., Aylward, R., Zachazewski, J., Paradiso, J., and Gill, T., "IMU Arrays: The Biomechanics of Baseball Pitching," The Orthopaedic Journal at Harvard Medical School, (Nov. 2006), vol. 8, pp. 90-94.

Cloete, T., and Scheffer, C., "Benchmarking of a full-body inertial motion capture system for clinical gait analysis," 30th Annual International IEEE EMBS Conference, Vancouver, British Columbia, Canada, (Aug. 20-24, 2008), pp. 4579-4582.

Dillman, C., Fleisig, G., and Andrews, J., "Biomechanics of Pitching with Emphasis upon Shoulder Kinematics," Journal of Orthopaedic & Sports Physical Therapy, (Aug. 1993), vol. 18, No. 2, pp. 402-408.

Feltner, M. and Dapena, J., "Dynamics of the Shoulder and Elbow Joints of the Throwing Arm During a Baseball Pitch," International Journal of Sport Biomechanics, (Nov. 1986), vol. 2, No. 4, pp. 235-259.

Fleisig, G. S., Bolt, B., Fortenbaugh, D., Wilk, K. E., and Andrews, J. R., "Biomechanical Comparison of Baseball Pitching and Long-Toss: Implications for Training and Rehabilitation," Journal of Orthopaedic & Sports Physical Therapy, (May 2011), vol. 41, No. 5, pp. 296-303.

Fleisig, G., Barrentine, S., Zheng, N., Escamilla, R., and Andrews, J., "Kinematic and kinetic comparison of baseball pitching among various levels of development," Journal of Biomechanics, (Dec. 1999), vol. 32, No. 12, pp. 1371-1375.

Jinji, T. and Sakuri, S., "Throwing arm motion to determine spin axis of pitched baseball," presented at the XXIV ISBS Symposium, Salzburg, Austria, 2006.

King, K. W., "The design and application of wireless MEMS inertial measurement units for the measurement and analysis of golf swings," University of Michigan, Ann Arbor, MI, (2008), 150 pages.

King, K., Yoon, S. W., Perkins, N. C., and Najafi, K., "Wireless MEMS inertial sensor system for golf swing dynamics," Sensors and Actuators A: Physical, (Feb. 15, 2008), vol. 141, No. 2, pp. 619-630.

King, K.W., and Perkins, N.C., "Putting Stroke Analysis Using Wireless Mems Inertial Sensor System," (2008), World Scientific Congress on Golf V, Phoenix, AZ, pp. 270-278.

Koda, H., Sagawa, K., Kuroshima, K., Tsukamoto, T., Urita, K., and Ishibashi, Y., "3D Measurement of Forearm and Upper Arm during Throwing Motion Using Body Mounted Sensor," Journal of Advanced Mechanical Design Systems and Manufacturing, (2010), vol. 4, No. 1, pp. 167-178.

Lapinski, M., Berkson, E., Gill, T., Reinold, M., and Paradiso, J. A., "A Distributed Wearable, Wireless Sensor System for Evaluating Professional Baseball Pitchers and Batters," 2009 International Symposium on Wearable Computers, Proceedings, Los Alamitos: IEEE Computer Soc., (2009), pp. 131-138.

Mayagoitia, R., Nene, A., Veltink, P., "Accelerometer and rate gyroscope measurement of kinematics: an inexpensive alternative to optical motion analysis systems," (2002), Journal of Biomechanics, vol. 35, pp. 537-542.

Nathan, A. M., "The effect of spin on the flight of a baseball," American Journal of Physics, (Feb. 2008), vol. 76, No. 2, pp. 119-124.

Perkins, N., and Richards, B., "Understanding Your Casting Stroke," Fly Fisherman, (Dec. 2003), pp. 34-37 and 66.

Randolph, J., "Casting in the Groove," Fly Fisherman, (Dec. 2003), p. 6.

Roetenberg, D., Luinge, H., and Slycke, P., "Xsens MVN: Full 6DOF Human Motion Tracking Using Miniature Inertial Sensors," XSENS Technologies, (Apr. 2009), pp. 1-7.

(56) References Cited

OTHER PUBLICATIONS

Sakuri, S., Ikegami, Y., Okamoto, A., Yabe, K., and Toyoshima, S., "A three-dimensional cinematographic analysis of upper limb movement during fastball and curveball baseball pitches," *Journal of Applied Biomechanics*, (1993), vol. 9, pp. 47-65.

Simo, J. C., Tarnow, N., and Doblare, M. "Non-linear dynamics of three-dimensional rods: Exact energy and momentum conserving algorithms," *International Journal for Numerical Methods in Engineering*, (May 1995), vol. 38, No. 9, pp. 1431-1473.

Theobalt, C., Albrecht, I., Haber, J., Magnor, M., and Seidel, H.P., "Pitching a baseball: tracking high-speed motion with multi-exposure images," *ACM Trans. Graph*, (Aug. 2004), vol. 23, No. 3, pp. 540-547.

Zhou, H., Stone, T., Hu, H. and Harris, N., "Use of multiple wearable inertial sensors in upper limb motion tracking," (2008), Medical Engineering & Physics, vol. 30, pp. 123-133.

International Search Report, International Application No. PCT/US2014/032020, dated Aug. 21, 2014, 5 pages.

U.S. Appl. No. 14/224,386, filed Mar. 25, 2014, Perkins et al.

* cited by examiner

Fig-12

APPARATUS AND METHOD FOR IDENTIFYING AND ANALYZING THE FREE FLIGHT DYNAMICS OF A BODY

FIELD

The present disclosure relates to apparatus and methods for identifying and analyzing the free flight dynamics of a body and, more particularly, to apparatus and methods for identifying and analyzing the free flight dynamics of a body by directly measuring only three rigid body degrees of freedom or using such data for reduction of error.

BACKGROUND AND SUMMARY

This section provides background information related to the present disclosure which is not necessarily prior art. This section also provides a general summary of the disclosure, and is not a comprehensive disclosure of its full scope or all of its features.

Often in the analysis of movement of a body there is a need to determine the net forces and moments acting on the body. Whether it be during gait analysis of a human or animal, during the analysis of the throwing motion of baseball pitchers or the impact of sports equipment, or even during rehabilitation from injury or surgery, researchers can benefit from knowing the net loads that are placed on a subject's joints, body portions, or the equipment being used. Using a variety of methods, in some cases, these loads can be translated into individual muscle and passive tissue loading which has direct applications to the identification and prevention of injuries. Unfortunately, in the case of human or animal analysis, without invasive surgery, it is very difficult to directly measure the net joint forces and moments which are collectively referred to as the joint kinetics. However, given some information about the kinematics (acceleration, angular velocity and angular acceleration) of a subject, the joint kinetics can be deduced using inverse dynamics. These principles are equally applicable to analyzing the movement of equipment or bodies during impact, free flight, or other uses.

According to the principles of the present teachings, an apparatus is provided for analyzing free flight of a body including an inertial measurement unit having at least one accelerometer continuously measuring three orthogonal axes of acceleration and outputting data representative thereof and a processing unit operably receiving the data and determining three components of the angular velocity of the body during free flight.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 12 is a first exemplary metric of ball motion displaying data and calculations derived from the data gathered from the force and moment detection apparatus;

Corresponding reference numerals indicate corresponding parts throughout the several views of the drawings.

DETAILED DESCRIPTION

Figure 1:
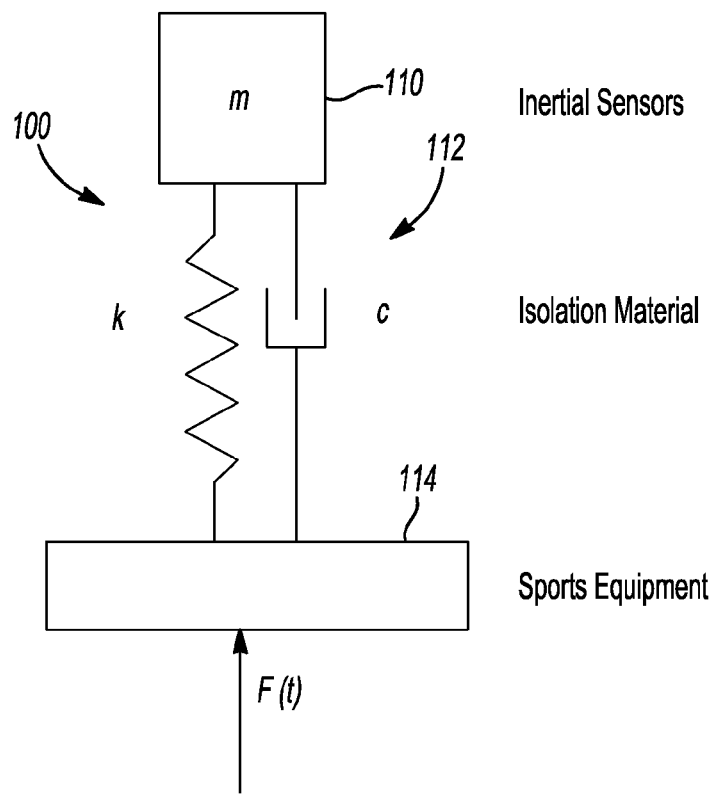
FIG. 1 is a schematic view of the force and moment detection apparatus operably coupled with sports equipment.

Example embodiments will now be described more fully with reference to the accompanying drawings. Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some embodiments, aspects and/or features of recited embodiments can be combined into additional embodiments not specifically recited herein.

The terminology used herein is for the purpose of describing particular example embodiments only and is not intended to be limiting. As used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Spatially relative terms, such as "inner," "outer," "beneath", "below", "lower", "above", "upper" and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

As discussed above, inverse dynamics may form a part of the present teachings. Generally, inverse dynamics is based on link-segment modeling; a rigid-body method of approximating the dynamic behavior of the human body. The link-segment modeling technique breaks a human system into a collection of rigid segments linked by joints. All segments have known geometry, mass, center of mass, and inertia tensor as dictated by anthropometric data. Given a link-segment model of a portion of the human body, all that is needed to determine the net kinetics acting at the joints is information about the kinematics (linear acceleration along with angular velocity and angular acceleration) of the rigid segments. Then, according to the Newton-Euler equations (1 & 2 respectively), the net forces and moments acting on a segment can be determined.

$$\Sigma \vec{F} = m\vec{a} \quad (Eq. 1)$$

$$\Sigma \vec{M} = d(I\vec{\omega})/dt = \vec{\omega} \times (I\vec{\omega}) + \dot{\vec{\omega}} I \quad (Eq. 2)$$

From these net forces and moments, which include the influence of the known weight of the segment, one can deduce the net joint force and moment by appropriately subtracting the influence of the known weight of the segment. There are a couple of different methods for determining the kinematical quantities appearing on the right-hand sides of Equations 1 and 2 which include the acceleration of the mass center of the segment ($\vec{a}$), the angular velocity of the segment ($\vec{\omega}$) and the angular acceleration of the segment ($\dot{\vec{\omega}}$), These methods, commonly referred to as motion capture, have varying degrees of accuracy, computational requirements, and applicability to studying natural human motion. They all provide the kinematic information needed to specify the right-hand sides of Equations 1 and 2.

Methods for Capturing Human Motion

The most popular method for recording human body kinematics is by using high-speed video, infra-red, or other cameras to track the three-dimensional position of a set of markers in space. The markers can be attached to the skin temporarily, rigidly attached to fixtures that are strapped tightly to various body segments, or (in rare cases) even attached directly to a subject's bones (e.g., by employing bone pins). The goal of tracking the markers is to develop an understanding of how the underlying bones are moving because their movement is what is approximated by the link-segment model. Unfortunately, there are several errors associated with each of these recording techniques that can skew the bone movement data. The errors are then magnified considerably by the four differentiation steps that are needed to solve for three kinematic quantities ($\vec{a}, \vec{\omega}, \dot{\vec{\omega}}$) specified above. For example, forming the acceleration a requires two successive differentiations of the position data. Forming the angular velocity $\vec{\omega}$ first requires forming angular orientation measures (e.g. Euler angles, Euler parameters or similar) which themselves require differencing position data. The orientation measures must then be differentiated to obtain angular velocity. Next, the subsequent formation of angular acceleration $\dot{\vec{\omega}}$ requires a final differentiation of the angular velocity. Following these four derivative operations (and one difference operation), one can then solve for the net forces and moments acting on a segment per Equations (1) and (2). The differentiation operations are fraught with errors due to the presence of measurement noise and resolution limits of measuring the positions of the markers.

One of the most common problems that exists with skin-mounted markers is that there is usually movement of the soft tissue (i.e. skin, muscle, fat) between the marker and the bone. The small errors that result from this skin movement artifact are amplified considerably when the position data is numerically differentiated causing much larger errors in the kinetic predictions. The goal, for some researchers, has been to minimize this error. In some prior art systems, a number of different marker configurations are used during gait analysis to determine the optimal orientation for minimizing the effect of skin movement on position data. They tested constrained and unconstrained marker arrays, different attachment methods, and the effect of physical location of the arrays on the leg and found a particular combination of factors that was able to minimize the effect of skin movement. Some studies have used marker arrays that are physically connected to the bone however, these often affect movement patterns and therefore are good for testing the accuracy of less invasive (and more temporary) marker attachment methods, but are not often used to study motion on a larger scale. Methods have also been developed that use stereo radiography and more recently real-time MRIs to give very accurate descriptions of bone movement, however they expose subjects to radiation (stereo radiography) and prevent natural movement (MRI) due to many constraints associated with in-lab use. It should also be appreciated that many of these prior art solutions require cumbersome apparatus and systems for gathering of data.

One method that has been developed to try to circumvent the errors associated with skin movement is "markerless" motion capture. This method uses passive vision systems to capture human motion and then a computer model to determine the kinematics (and hence kinetics) of individual body segments. Some of the prior art systems employ a motion capture system that relies on the images from eight high-speed cameras to fit a "visual hull" to a person. The hull gives an approximation of the human form which, given some ideal assumptions, can allow for the position of the bones to be determined. This method theoretically reduces the effect of skin movement error on marker positioning. Other systems have been developed that employ a method for two-dimensional (sagittal plane) markerless motion capture in gait analysis. They fit a five-segment model to the contours of the lower leg for every frame of a recorded gait sequence using distance transformations. The model then supplied the position information of the lower leg segments without having to rely on skin-fixed markers. Unfortunately, this method was computationally inefficient at the time, requiring over four minutes to upload and fit the model to each frame of the video.

Another method adopted by researchers is to directly measure the kinematic quantities needed to solve for net joint kinetics using inertial sensors (accelerometers and angular rate gyros) It has been shown that accelerometers, along with position information for the accelerometers, can be used to determine all of the necessary kinematic quantities. More recently, a combination of accelerometers and angular rate gyros (a combination known as an inertial measurement unit or IMU) can be used to directly measure acceleration and rate of rotation in all three dimensions.

This technology means that net joint kinetics can now be determined with one numerical differentiation (of angular velocity to yield angular acceleration) instead of four differentiations of position and angle data in motion capture methods, thus substantially reducing error. It has been shown that when instrumented with an array of IMUs, the kinematic measurements closely matched those predicted by a well established video-based motion capture method. It is important to remember that with this technique, testing is no longer constrained to a laboratory setting, meaning that, for example, athletes can be instrumented during a game setting to collect data or during training or injury recovery. This ensures that movement is as natural as possible under testing conditions. Also, using IMUs to capture human movement substantially reduces the necessity for numerical differentiation which is the major source of error in employing the inverse dynamics methodology.

Inverse Dynamics Modeling

Most commonly an iterative solution to the Newton-Euler equations is used to determine the net joint kinetics. If only angular acceleration data is available, then the iteration starts at the most proximal end of the system being analyzed and progresses distally. Because the angular accelerations are usually determined with two numerical differentiations, this method produces noisy joint kinetic estimates. In an effort to reduce the noise, additional measurements of reaction kinetics are typically taken, and the analysis technique is altered to accommodate the additional equilibrium equations. Specifically, some methods employ a least-squares optimization technique to make use of the additional constraints placed on the system to improve the accuracy of the kinetic estimates.

Despite the efforts of researchers to minimize the errors associated with the kinematic inputs to an inverse dynamics analysis, it is still well recognized that these analyses are prone to errors. In fact, it has been determined that the five most common sources of error are as follows: (1) estimates of body segment parameters (i.e. geometry, mass, inertia); (2) segment angle calculations due to relative movement between surface markers and the underlying bone structure (skin movement artifact); (3) identification of joint center locations; (4) errors related to force plate measurements; and (5) motion marker noise and its effect on segmental accelerations. In some studies, it has been suggested that the approximation of joint centers as a possible source of error for inverse dynamics during gait analysis.

Several articles have focused on minimizing the number of these errors that they introduce into their analyses. For example, in some applications, in an attempt to reduce these errors associated with numerical differentiating position data, an iterative optimization approach is used where hip, knee, and ankle torques are varied until the joint angle time histories matched those measured using motion capture. Some have developed an EMG-based musculoskeletal model that could accurately predict net joint torques from EMG readings. This method also avoids many of the most common sources of error. Finally, it should be understood that the use of kinematics as captured with IMUs, avoid several of the common sources of error mentioned.

Miniaturized IMU Sensor Board

The present teachings provide apparatus and methods to determine the forces and moments acting on a single or multiple (connected) rigid bodies by exploiting measurements made possible by miniature inertial measurement units (IMU's).

The present teachings disclose how one may use these miniature IMU's for a new purpose; namely for the determination of the forces and moments applied to sports equipment, the forces and moments acting on major body segments, and, in general, the forces and moments acting on any rigid body or system of rigid bodies. Thus, these teachings concern how one can use miniature IMU's for determining kinetic quantities (forces and moments) in addition to or instead of the purely kinematic quantities considered in prior art concerning the use of miniature IMU's for sports and/or human motion analysis.

The teachings follows from data collected from miniature IMU's as input to inverse dynamic models which are then used to compute the resultant forces and moments acting on the rigid body (or bodies). The ability to determine the forces and moments acting on sports equipment and on major body segments has enormous implications for sports training, health and injury monitoring, prosthetic devices, human assistive technologies, robotics, and many other applications requiring the analysis of human movement. As one example, consider the sport of baseball and the potential injuries suffered by pitchers who develop excessive forces and moments across their elbow or shoulder joints. Consider also the benefit of knowing the force and moment created by a golfer's hands on a golf club during a golf swing, or the force/moment created by a bowler's hand on a bowling ball, etc. These teachings provide a highly portable, inexpensive and noninvasive way to quantify these reaction forces and moments at the shoulder, elbow, wrist, and fingers during live pitching, golfing, bowling, etc. The major competing technology for deducing these forces/moments is to employ motion capture cameras or (high speed) video capture. However, the present teachings provide significant advantages over camera-based systems, including greater accuracy, greater portability (ease of use), and lower cost.

Common to camera-based and IMU-based methods is the reliance on inverse dynamic models that relate basic kinematic quantities (acceleration, angular acceleration and angular velocity) to the forces and moments acting on a rigid body through the Newton/Euler equations of rigid body dynamics. As reviewed above, the methods differ substantially in how one arrives at the kinematic quantities for this purpose. Camera-based methods fundamentally begin by measuring the position of points on a rigid body. From these position measurements, one must then estimate angular orientation, differentiate position and angular orientation to yield velocity and angular velocity, and then differentiate those results again to yield acceleration and angular acceleration. The need for substantial (four) differentiations is a serious concern as each differentiation potentially magnifies the effect of measurement noise. By contrast, the IMU-based method of the present teachings fundamentally measures acceleration and angular velocity directly. One need only perform a single differentiation of angular velocity to yield angular acceleration to yield the data necessary for inverse dynamic models for the prediction of forces/moments. This method presents a major advantage that translates to greater accuracy for the computed forces/moments. A second major advantage is afforded by employing miniature, wireless IMU's. Doing so leads to a highly portable testing system that can be used in any environment (e.g., in a home or on the actual field of play) instead of in a specialized motion capture laboratory. A third major advantage is cost savings. The miniature wireless IMU's are orders of magnitude less expensive than traditional motion capture systems. The following examples provide further details on the collection and the analysis of kinematic data from equipment-worn and/or body-worn IMU's for analyzing kinetic quantities (forces and moments).

Figure 22:
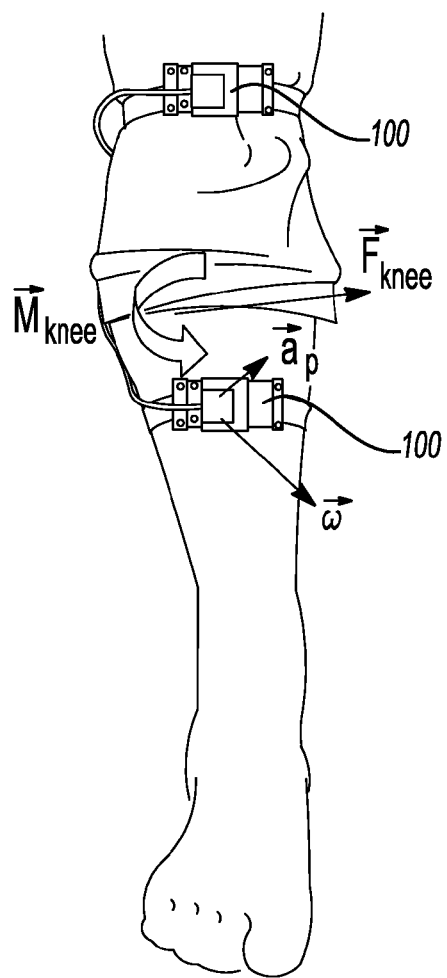
FIG. 22 is a photograph of IMU sensor boards disposed above and below a user's knee.

Shown in FIG. 22 is a photograph of two IMU sensor boards 120 according to the present teachings positioned to measure forces and moments across the knee joint and the hip joint. In this instance, one IMU is attached to the lower leg and a second to the upper leg using elastic bands. (Alternatively, one might embed IMU sensor board 120 in the hem of a form fitting sock and shorts or suitably attach to the limbs by other means.) Data from the first IMU is used to formulate the Newton-Euler equations of motion of the lower leg and thus provide the means to compute the force and moment across the knee joint, denoted $\vec{F}_{knee}$ and $\vec{M}_{knee}$ in FIG. 22. Doing so, requires knowledge of a) the acceleration of the mass center of the lower leg $\vec{a}_c$, b) the angular velocity $\vec{\omega}$ and angular acceleration $\dot{\vec{\omega}}$ of the lower leg and, and c) the mass m and inertia tensor I of the lower leg. Of these, the angular velocity $\vec{\omega}$ is directly measured by the angular rate gyros embedded in IMU sensor board 120 and the angular acceleration $\dot{\vec{\omega}}$ is computed following differentiation of the angular velocity with respect to time. The acceleration of the mass center $\vec{a}_c$ of the lower leg follows by computing:

$$\vec{a}_c = \vec{a}_p + \dot{\vec{\omega}} \times \vec{r}_{c/p} + \vec{\omega} \times (\vec{\omega} \times \vec{r}_{c/p}) \qquad (3)$$

in which $\vec{a}_p$ is the acceleration measured by the accelerometer, $\vec{\omega}$ and $\dot{\vec{\omega}}$ are the previously measured and computed angular velocity and angular acceleration, and $\vec{r}_{c/p}$ is the position vector locating the mass center of the lower leg relative to the position of the accelerometer. This position vector can be measured (or estimated) independently following the placement of IMU sensor board 120 on the lower leg using known or estimates of anthropomorphic data.

Figure 11:
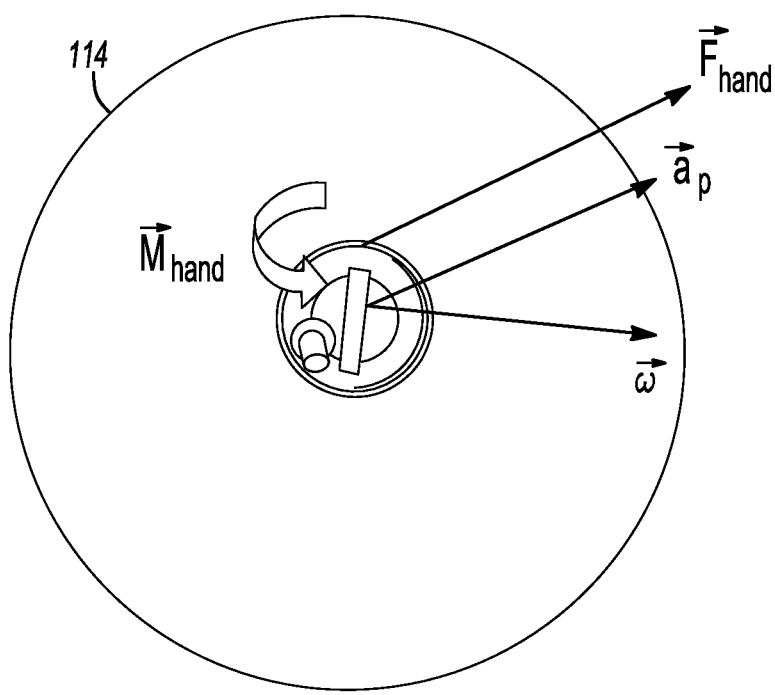
FIG. 11 is a photograph of an exemplary bowling ball having the force and moment detection apparatus of the present teachings disposed therein using a mating sleeve.

As an example of using the IMU-derived data for an inverse dynamics calculation, consider the simpler case of an IMU mounted in a bowling ball and then the computation of the net force and moment of the bowler's hand on the ball. FIG. 11 illustrates a bowling ball with IMU sensor board 120 mounted in a small hole. Analogous to the example above, IMU sensor board 120 measures the acceleration $\vec{a}_p$ of one point called p (the location of the tri-axial accelerometer) and the angular velocity of the ball $\vec{\omega}$.

Application of Newton's Second Law Requires $$\vec{F}_{hand} + \vec{W}_{ball} = m\vec{a}_c \qquad (4)$$

where m denotes the known mass of the ball and $\vec{W}_{ball}$ is the known weight of the ball. Again, $\vec{a}_c$ denotes the acceleration of the mass center of the ball and it can be computed as shown in Eq. 3 above. Thus, one can readily solve for the reaction force of the bowler's hand on the ball from Eq. 4. In an analogous manner, Euler's second law about the mass center of the ball requires $$\vec{M}_{ball} + \vec{r}_{g/c} \times \vec{F}_{hand} = \underline{I}\dot{\vec{\omega}} + \vec{\omega} \times (\underline{I}\vec{\omega}) \qquad (5)$$

where $\vec{r}_{g/c}$ denotes the position of the center of the grip (between thumb and finger holes) relative to the mass center of the ball and $\underline{I}$ is the centroidal inertia tensor of the ball (known from ball design data). Thus, one can now solve for the reaction moment of the bowler's hand on the ball from Eq. 5.

Applications of Inverse Dynamics to Injury Prevention/Clinical Environment

As one can imagine, it is of interest to people who study human movement to understand the forces that are placed on specific active (i.e. muscles) and passive (i.e. ligaments, tendons, etc.) tissues. Knowing these loads gives researchers the information necessary to diagnose the specific cause of injury and can also provide a means for preventing injury in both the short and long term. The issue with determining the forces applied by individual muscles is redundancy. The human body is full of redundant systems, meaning that there isn't only one muscle responsible for providing a certain force to a joint. The difficulty lies in determining the contribution of each of these redundant muscles to the net joint kinetics.

Researchers tend to employ static and dynamic optimization schemes to predict the contributions of individual muscles to the overall net joint kinetics. The theory behind these optimizations is to pick individual muscle forces that minimize some sort of function (i.e. sum of squared muscle force, or sum of total muscle work). Typically, the maximum muscle force is also somehow limited to provide another boundary condition for the solution. A static optimization usually relies on the net joint moments calculated through inverse dynamics and then solves the muscle redundancy problem at each step during time, so that once fully analyzed a complete time history of the individual muscle forces is created. In contrast, a dynamic optimization does not break the analysis into separate time steps. Instead, it relies heavily on joint-muscle models to determine individual muscle contributions during movement.

The difference between many of the studies that attempt to use optimization schemes is the quantity that they choose to minimize during their optimizations.

It should thus be appreciated that by employing the principles of the present teachings, namely measuring the kinematics directly using IMU's, errors associated with segment angle calculations due to relative movement between surface markers and the underlying bone structure (skin movement artifact); errors related to force plate measurements; and motion marker noise and its effect on segmental accelerations becomes much less significant compared to classical camera-based motion capture.

Application of IMUs to Various Bodies

As first described in commonly-assigned U.S. Pat. Nos. 7,021,140 and 7,234,351, which are hereby incorporated by reference, it has been shown generally that inertial sensors 110 (e.g., MEMS accelerometers and/or rate gyros) can be used as the means to measure the rigid body dynamics of sports equipment, with some limitations.

By way of the present teachings, it will be more fully understood that with some changes these principles can be applicable to a wide variety of applications, including analysis of sports equipment, athletes, animals, patients, and the like. In other words, according to the principles of the present teachings, knowing the rigid body dynamics of the sports equipment or other equipment or member enables one to quantify equipment performance, athletic performance and/or general physiological properties. It should also be appreciated that the principles of the present teachings are equally applicable to equipment or members that are elongated, round, oval, or have any other shape. As will be explained, in some embodiments, the shape of the equipment or member can be, in some embodiments, irrelevant to acquisition of relevant data. It should be understood that the use of the terms "sports equipment" (or sports equipment 114) in the present application and in connection with preferred embodiments should not be regarded as limited to only sports equipment, but can include other equipment or bodies, such as rehabilitation equipment, training equipment, conditioning equipment, stress analysis equipment or other equipment useful in the determination of forces on a body, hand-held or hand-operated tools, devices, and equipment of all kinds, such as but not limited to construction; manufacturing; surgical; dental; and controls for aircraft, cars, weaponry, and the like.

In connection with the present teachings, the sensors, which output signals that are proportional to the acceleration (of a point) and the angular velocity of the moving body of sports equipment, can be used to compute useful kinematic measures of sports equipment and other equipment or body motion. By non-limiting example, such measures can include the velocity and orientation of the head of a golf club, the inclination of a baseball bat in the strike zone, the spin of a bowling ball, the dribble rate of a basketball, and the like. For many applications, the body of sports equipment may undergo an important transition from non-free flight dynamics to free flight dynamics as in, for example, the case of a baseball being thrown and released by a pitcher's hand. Similar transitions to free-flight arise in nearly all games employing balls such as football, tennis, golf, bowling, basketball, soccer, volleyball, to name a few examples, as well in other thrown launched objects such as javelins, discuses, shotputs, arrows, plastic discs (i.e. Frisbee®), etc. In these applications, the transition from non-free flight to free flight is of paramount interest for assessing athletic performance. In other words, skill in these sports in closely associated with achieving the correct "release conditions" as the object begins the free flight phase of motion.

Method of Attaching and Protecting Sensors

In some embodiments, the present teachings can provide apparatus and methods for attaching inertial sensors 110 within or on sports equipment and simultaneously the means to protect such sensors from unwanted shock and vibration when in use.

A major challenge in accomplishing this goal is to attach or embed the sensors in sports equipment with a view towards protecting them from the impact forces that are regularly delivered to sports equipments during play. Impact may arise from contact with another piece of sports equipment (e.g. ball or puck with bat, racquet, club, stick, etc.) or with surfaces (e.g., ball, bat, racquet, club, stick on floor, wall, ceiling, fence, helmet, etc.) Such impact events produce extremely large forces (e.g., hundreds to thousands of g's when normalized by the weight of the equipment) that are of very short duration. The impacts generate structural waves in the equipment that typically propagate freely from the impact site to the site of sensor attachment. These impact-generated waves can severely degrade and/or permanently damage small inertial sensors 110 (e.g., MEMS scale, standard piezoelectric or any other type) being used for overall motion sensing (e.g., for measuring rigid body motion of the equipment). The sensors have limits to the shock they can reliably sustain before failing. Even below these limits, shock and vibration can lead to unwanted sensor output relative to the desired output associated with rigid body motion (i.e. the sensor output becomes the sum of that due to rigid body motion—desirable—and that due to impact-generated shock and vibration—undesirable).

Thus to succeed in achieving a system for sports training, it is desirable to properly isolate the sensors from unwanted, impact-generated shock and vibration. To this end, we have designed a family of sensor mounting concepts that attenuate shock and/or vibration inputs in sports equipment. These mounting concepts enable the inertial sensors 110 of the present teachings to survive harsh impacts (e.g., the impact of a golf club with a golf ball, a baseball bat with a baseball, a basketball with the floor, etc.). In some embodiments, the mounts employ compliant and dissipative materials (e.g. elastomers, foams, etc.) that significantly attenuate the shock and vibration that would otherwise be delivered to the sensors while in use.

A second challenge in deploying inertial sensors 110 on or in sports equipment is the need to align or to measure the alignment of the sensor axes relative to the major geometric features of the sports equipment. Consider the example of a golf club. A major indicator of skill in swinging a club is to achieve at impact the proper lie, loft and face angles of the club head. These three angles can be computed from sensor data (e.g., integrating the angular rate gyro data) using the algorithms set forth in the literature. However, to employ these algorithms one must first set or measure the three-dimensional orientation of the sensor axes relative to axes used to define the orientation of the club head. However, in many cases and in order to reduce sensor shock and vibration, it may be desirable to place the sensors not on the club head but on or in the shaft of the club and at the distal (grip) end. Then one must set or measure the orientation of the three axes that define the sensor system in the shaft relative to the three axes that define the orientation of the club head.

The principle of the present teachings covers two major solutions to resolve this challenge. One way is to achieve a prescribed orientation using mounting hardware that sets the orientation of the sensors. The second way is to measure the orientation actually achieved following mounting by in-situ calibration tests on the finished equipment. Once either method is employed for a golf club, one can then deduce the orientation of the club head from the data that describes the orientation of the sensors. This same need arises in all other applications whenever there is a need to know the position or orientation of a geometric feature. Examples include hockey (the orientation of the blade), baseball (the orientation of the bat label or the ball stitches), bowling (the orientation of the finger and thumb holes or center grip), and perhaps basketball (the orientation of the grooves or other ball features), and the like.

Principle of Shock and Vibration Isolation

With reference to FIGS. 1-8, the goal of reducing shock and vibration can be achieved by mounting the inertial sensors 110 on shock and vibration isolators 112 composed of compliant and/or dissipative materials (collectively, force and moment detection apparatus 100). The concept is schematically illustrated in FIG. 1 where the inertial sensors 110 are denoted by the mass m and the stiffness and damping of the material of the vibration isolators 112 is denoted by k (or compliance 1/k) and c, respectively. In sports applications, shock loads F(t) delivered to the sports equipment 114 may be significantly reduced by the isolation material prior to reaching and possibly damaging the inertial sensors 110. The stiffness and damping of the isolation material can be chosen to greatly attenuate the shock and vibration experienced by the sensors.

The degree of isolation against shock is determined by the following two non-dimensional parameters:

$$p = t_s / (2\pi / \sqrt{k/m})$$ (Eq. 6)

and $$\zeta = \frac{c}{2\sqrt{mk}}$$ (Eq. 7)

The first parameter p denotes a non-dimensional ratio of the (short) time duration of the shock loading ($t_s$) and natural period of oscillation of the mass and spring system ($2\pi/\sqrt{k/m}$). For superior shock isolation, this ratio should be minimized which is achieved by having soft isolation material (i.e., isolation material stiffness k should be reasonably small). The second parameter $\zeta$ denotes the so-called damping ratio. For superior shock isolation, the damping ratio should be maximized (i.e., isolation material damping c should be reasonably large).

The degree of isolation against vibration is determined by the damping ratio $\zeta$ introduced in Eq. 7 above as well as by the non-dimensional frequency parameter $$r = \omega_{excitation} \sqrt{k/m}$$ (Eq. 8)

in which $\omega_{excitation}$ denotes the frequency of a harmonic excitation. In this instance, vibration isolation is achieved whenever $r > \sqrt{2}$. Moreover, superior vibration isolation follows by minimizing $\zeta$.

Various Embodiments

In practice, there are many materials and configurations of materials that can be effectively used in providing shock and/or vibration isolation for inertial sensors 110 mounted on or in sports equipment 114. Examples of these materials include various open-cell and closed-cell foams, rubbers, polymers (e.g. silicon rubber), cork, fluid- or gas-filled bladders, springs, and the like. The following examples serve as illustrations of effective designs for a variety of sports applications. These examples, which depict a wide range of mounting methods that incorporate shock and vibration isolation solutions, are illustrative and not comprehensive. One skilled in the art could incorporate similar elements in designs not included in the following.

Figure 2:
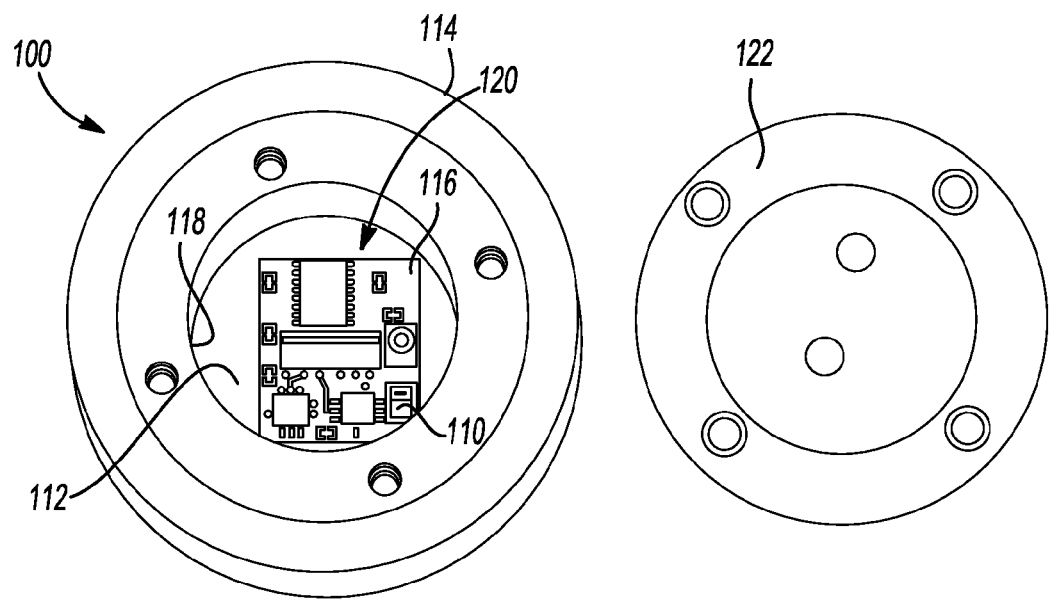
FIG. 2 is a photograph of an exemplary hockey puck having the force and moment detection apparatus of the present teachings disposed therein.

In some embodiments, as illustrated in FIG. 2, inertial sensors 110 can be disposed on a printed circuit board 116 (collectively, a IMU sensor board 120) and then placed within a small machined pocket 118 of a hockey puck 114. In this design, the IMU sensor board 120 is placed within the pocket 118 on a bed of foam rubber 112 which surrounds the printed circuit board 116. When a cap 122 is added to the top of this design (also lined with foam rubber), the IMU sensor board 120 is completely encased within the puck 114 and surrounded by a layer of slightly compressed foam rubber 112. The foam rubber 112 provides the stiffness and damping required for shock isolation and enables this IMU sensor board 120 and inertial sensors 110 to survive even the most intense shock loads delivered to the puck by a hockey stick, and the impacts of the puck off the ice and boards.

Figure 3:
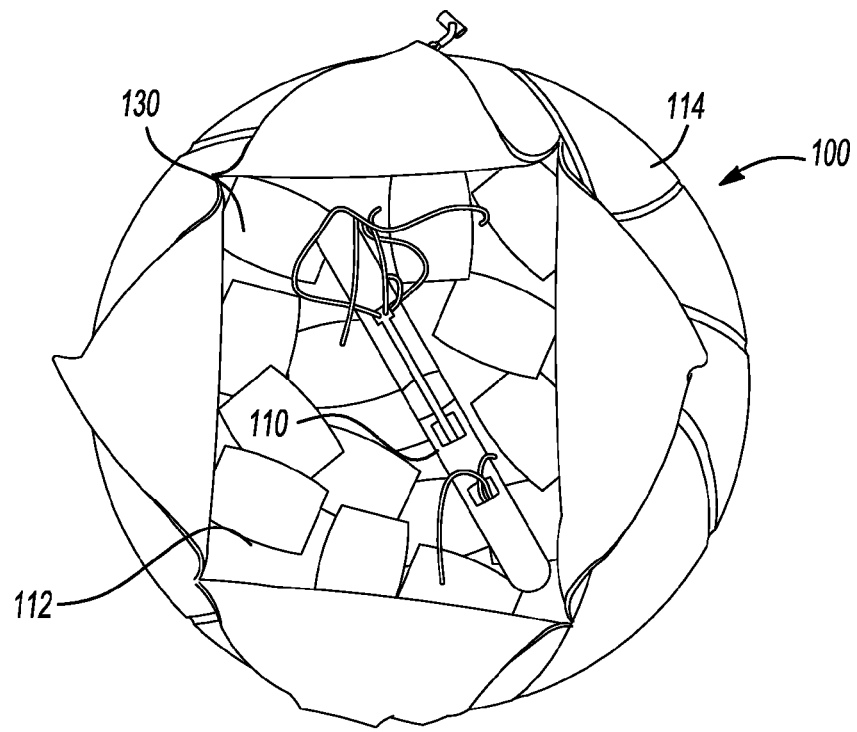
FIG. 3 is a photograph of an exemplary basketball having the force and moment detection apparatus of the present teachings disposed therein.

With reference to FIG. 3, in some embodiments, a similar concept can be employed where a complete wireless and battery powered inertial sensor 110 is inserted into the bladder 130 of a basketball 114 together with nodules of foam rubber 112 to fill the void inside the ball. The foam rubber 112 again provides the essential stiffness and damping to enable this design to survive repeated shock loads as the basketball is dribbled, shot and passed on the court. In this application, a slender battery-powered, wireless inertial measurement unit sensor 110 and/or board 120 can be inserted through an external port into the interior of a basketball 114, together with a bed of foam rubber nodules 112. Upon sealing the insertion port, the ball can be inflated to normal pressure and the foam-filled cavity serves as the shock isolation system. A recharging jack can be positioned at the ball surface with access through a sealed, small "port".

Figure 4:
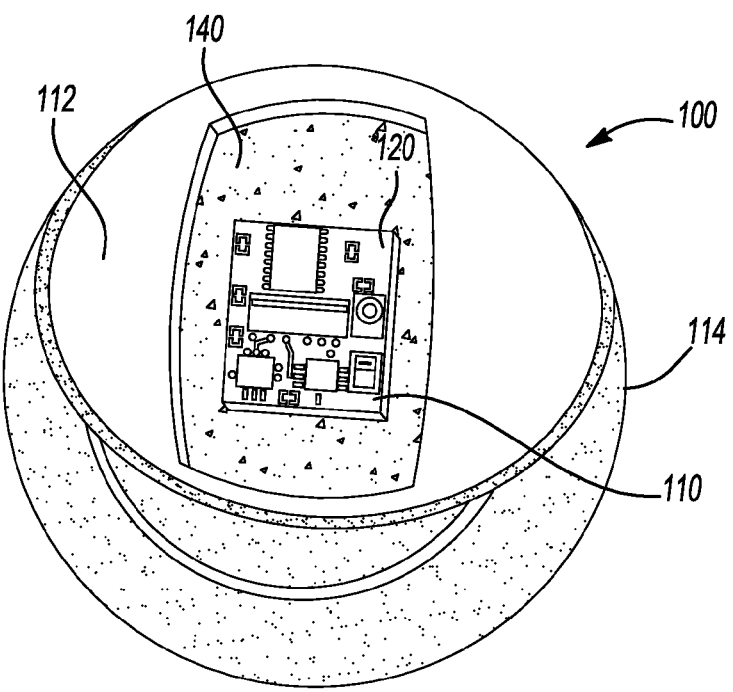
FIG. 4 is a photograph of an IMU sensor board disposed in an exemplary baseball core collectively operating as the force and moment detection apparatus of the present teachings.

With reference to FIG. 4, in some embodiments, in application relating to smaller balls, such as baseballs, a highly-miniaturized, wireless, battery-powered inertial sensor 110 and/or IMU sensor board 120 can be placed directly in a pocket 140 machined from the cork and rubber core of a baseball or softball. In this application, the cork and rubber core of the baseball can serve as the shock and vibration isolator 112. That is, this material possesses sufficient stiffness and damping to allow this design to survive the shock induced upon catching or hitting a pitched ball. However, in some embodiments, the pocket 140 can further be packed with other dampening materials 112, such as foam rubber. The ball skin can then be sewn in place as normal.

Figure 5:
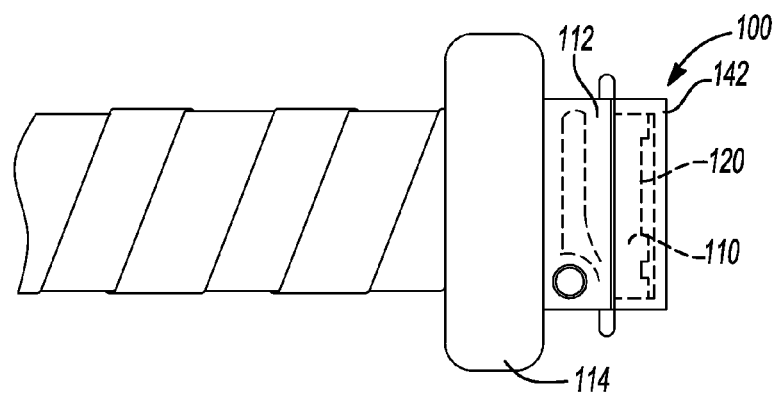
FIG. 5 is a photograph of an exemplary baseball bat having the force and moment detection apparatus of the present teachings disposed thereon.

Referring now to FIG. 5, and still in connection with baseball or softball, the highly miniaturized Inertial sensor 110 and/or IMU sensor board 120 can be encased within a plastic enclosure or other housing 142 that is mounted on the knob at the end of a baseball bat or there within. Within this housing, inertial sensor 110 and/or IMU sensor board 120 can be mounted to a thin foam rubber layer 112 that provides the requisite shock isolation.

Figure 6:
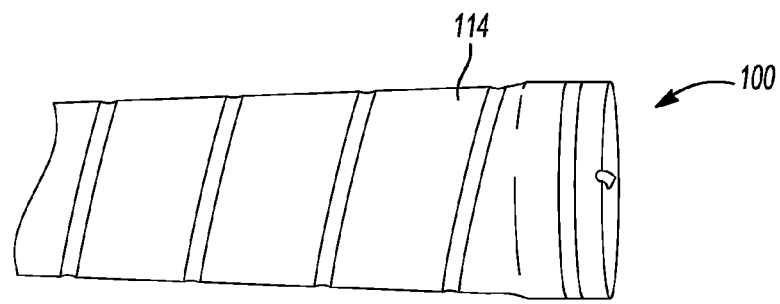
FIG. 6 is a photograph of an exemplary golf club having the force and moment detection apparatus of the present teachings disposed therein.
Figure 7:
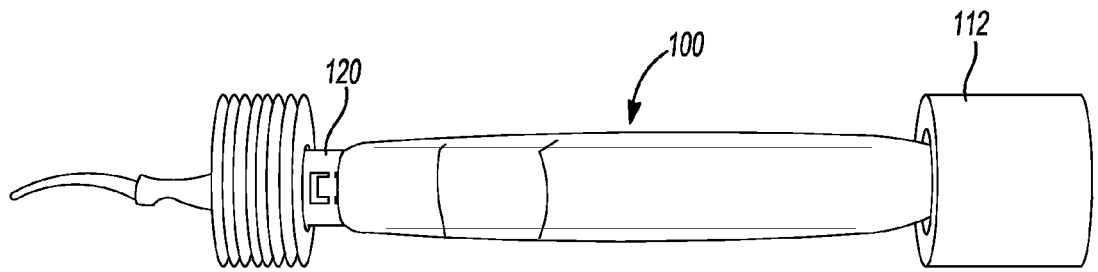
FIG. 7 is a photograph of an exemplary force and moment detection apparatus according to the principles of the present teachings.

With reference to FIGS. 6 and 7 and similar to the mounting on a baseball bat, in some embodiments a mounting system for a golf club can be used that places inertial sensor 110 at the end of the shaft and/or entirely within the small, internal confines of the shaft and captured by a plastic end cap which is mounted to the end of a shaft by a small layer of rubber. Shock isolation can now be achieved by using a layer of foam or rubber 112 between inertial sensor 110 (or IMU sensor board 120) and the cap-end of the grip.

Figure 8:
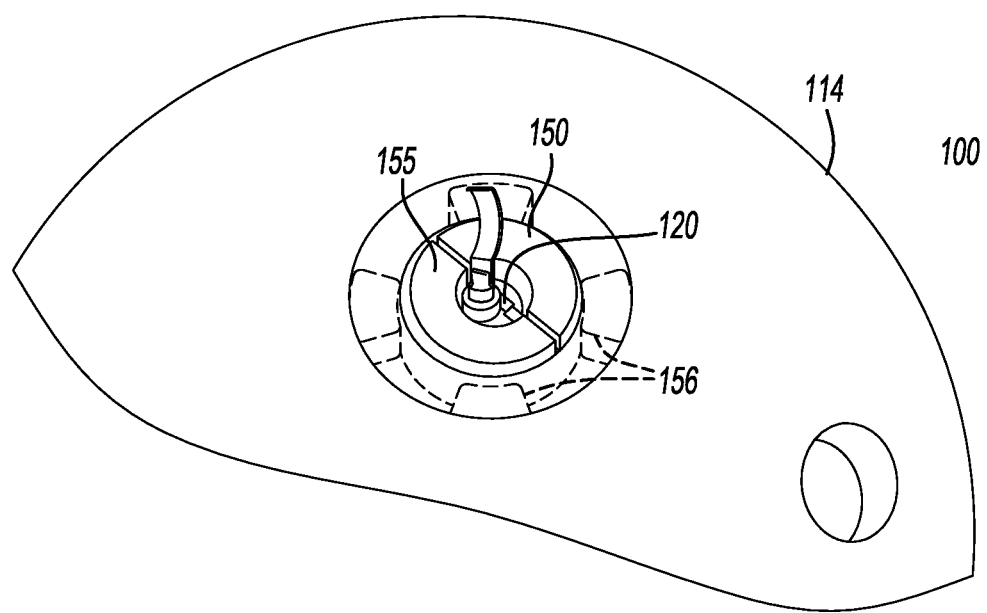
FIG. 8 is a photograph of an exemplary bowling ball having the force and moment detection apparatus of the present teachings disposed therein.
Figure 10:
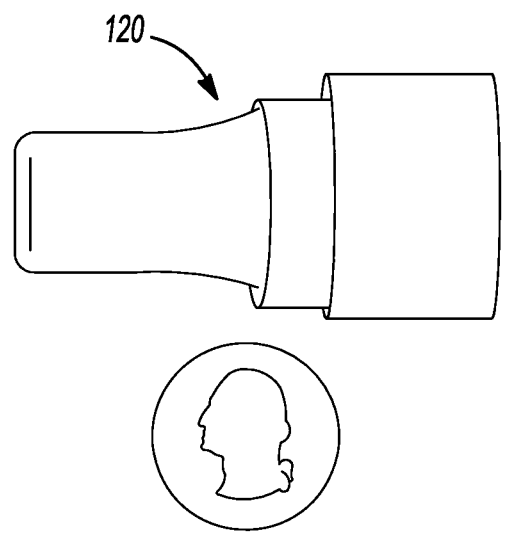
FIG. 10 is a photograph of the IMU sensor board shrink-wrapped for insertion into a bowling ball according to the principles of the present teachings.

Still further, with reference to FIG. 8, in some embodiments, an inertial sensor 110 or IMU sensor board 120 can be operably disposed within a bowling ball 114. In some embodiments, the inertial sensor 110 or IMU sensor board 120 can be supported within a pair of threaded/mating collars: an outer collar 150 and an inner collar 155. The threaded inner collar 155, also shown to the left in FIG. 7, rigidly captures the end of the IMU sensor board assembly 120 as shown in FIG. 7. The IMU sensor board assembly 120 is then inserted into a hole 152 drilled into the ball 114 and the inner collar is threadedly engaged into the stationary outer collar 150. The sensor assembly may also include a foam annulus 112 as shown to the right in FIG. 7 so that when it is assembled in the hole 152 it is protected from impacts against the interior of the hole. In some embodiments the outer collar 150 can be coupled to the bowling ball 114 via silicon webs 156. Shock isolation can be achieved either singly or in combination with silicon webs 156 and foam rubber 112. In some embodiments, IMU sensor board 120 can be elongated in a shrink-wrapped package that is captured within the body of a "thumb slug" of the bowling bowl as shown in FIG. 10 using a mating sleeve in a shallow hole drilled in the ball as shown in FIG. 11.

Apparatus and Method for Analyzing the Rigid Body Motion of a Body

As discussed herein, in some embodiment of the present teachings, an inertial measurement unit (IMU) sensor board 120 is used that contains inertial sensors 110 composed of accelerometers and angular rate gyros sufficient to measure the complete six degrees of freedom of the body of sports equipment 114. The inertial sensor 110 measures the acceleration vector of one point in/on the body as well as the angular velocity of the body. This can be accomplished by employing a single tri-axis accelerometer (alternatively, multiple single- or dual-axis accelerometers sufficient to measure the acceleration vector) and three single axis angular rate gyros (alternatively, fewer dual- or tri-axis angular rate gyros sufficient to measure the angular velocity vector).

Determination of the acceleration vector, representing three degrees of freedom, and the angular velocity vector, representing an additional three degrees of freedom, provides the means to compute the three-dimensional motion of the sports equipment 114 including the acceleration, velocity and position of any point associated with the body. In some embodiments, IMU sensor board 120 can transmit data to a central processing unit using wired or wireless transmission. In some embodiments, IMU sensor board 120 can comprise a microcontroller or microprocessor for data analysis (e.g. analog to digital conversion) and may also contain on-board memory storage (e.g. SD card or other memory storage device).

Figure 9:
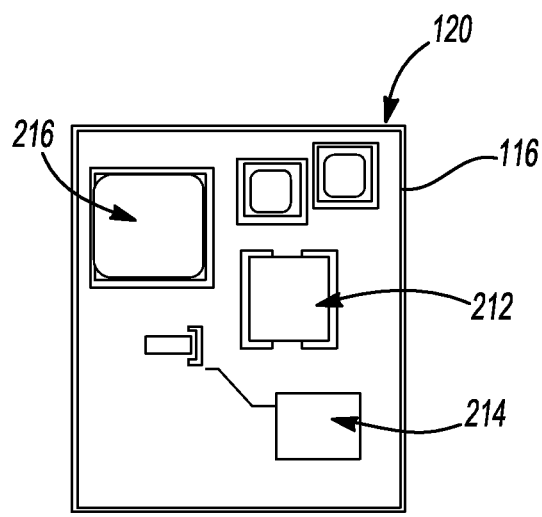
FIG. 9 is a photograph of the IMU sensor board according to the principles of the present teachings.

With particular reference to FIG. 9, IMU sensor board 120 of the present teachings is illustrated as a highly miniaturized, wireless IMU capable of sensing the full six degrees of freedom of a rigid body (three acceleration sense axes and three angular velocity sense axes). This highly miniaturized design employs a single (planar) circuit board 116 that still maintains three orthogonal sensor axes. The selected sensor components include a surface mount three axis accelerometer 212, a surface mount two axis angular rate gyro 214 (with two orthogonal sense axes in the plane of the circuit board) and a surface mount single axis rate gyro 216 (with sense axis orthogonal to the plane of the circuit board). It should be readily appreciated that the sensors 212, 214, and 216 (collectively, sensors 110) are each positioned and disposed on a single plane of the circuit board 116, thereby resulting in its compact form that overcomes many of the limitations of the prior art. In some embodiments, IMU sensor board 120 measures only 19 mm by 24 mm and has a mass of a mere 3 grams. As a result, attaching or embedding this miniature IMU has little influence on the mass or moments of inertia of a body of sports equipment 114 or body segments.

As discussed herein, the ability to extend the present teachings to all shapes of sports equipment 114 rests on the ability to use IMU sensor board 120 to measure the translation and rotation of a frame of reference fixed to the body of sports equipment 114. Essentially, IMU sensor board 120 measures the translation and rotation of three-axes attached to or fixed in the body of sports equipment 114. This information can then be used directly to understand the translation and rotation of the body of sports equipment 114 and any feature on that equipment (e.g., position and orientation of laces, holes, markings, features on a sphere/ball).

In some embodiments, IMU sensor board 120 transmits data wirelessly to a receiver station that is connected to a laptop computer by a USB cable. Data collection software on the laptop can control the data acquisition and write the data to a file for subsequent analysis. The sensor data can now be used to deduce the acceleration, velocity and position (of any point on the ball) as well as the angular acceleration, angular velocity and angular orientation of the ball as described herein. Collectively, and in the context of bowling, these kinematic quantities provide significant information about ball motion that can be used for bowler training, ball fitting (drilling), and ball design.

Figure 12:
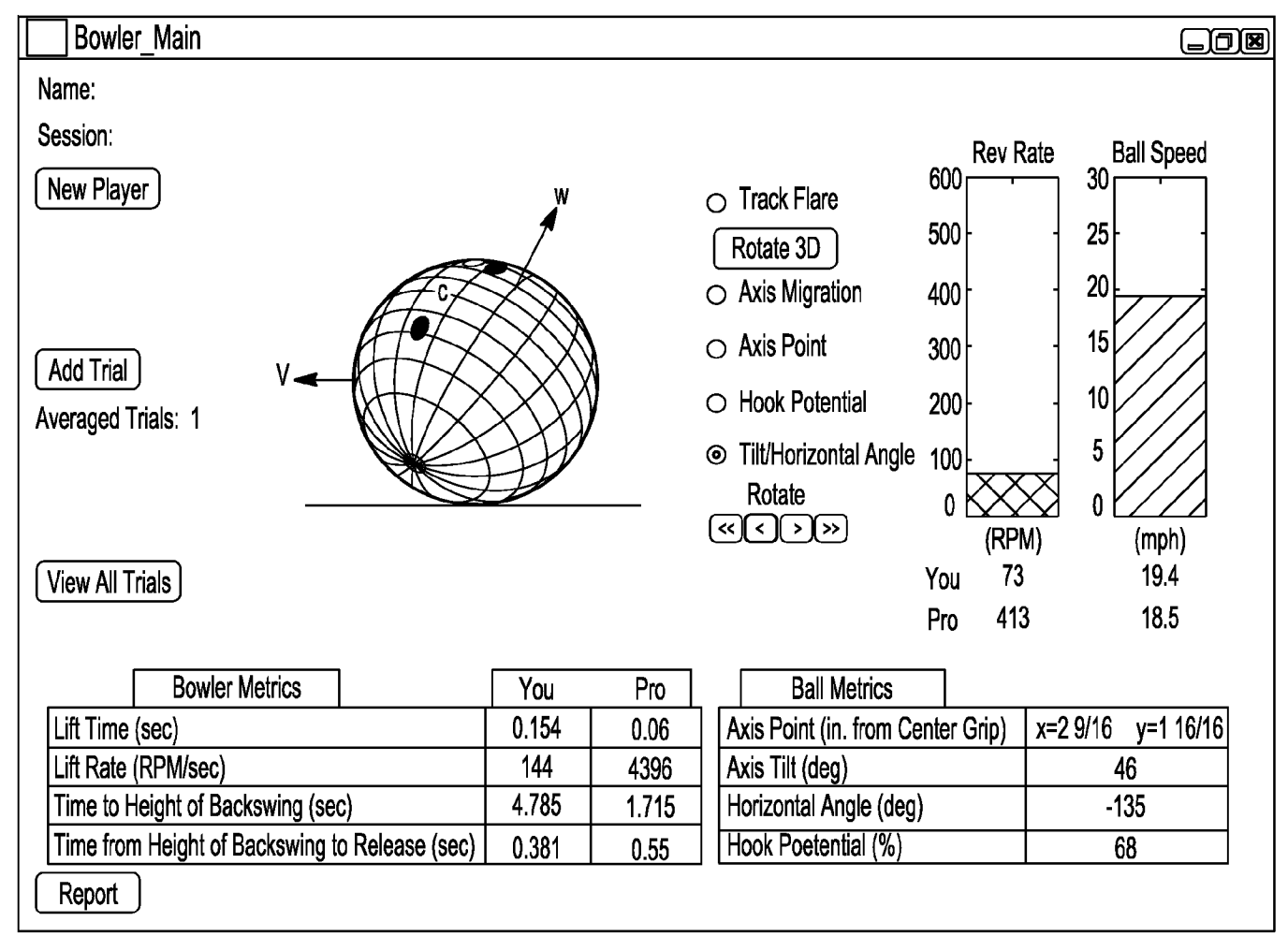

FIG. 12 illustrates exemplary bowler and ball motion "metrics" that are derivable from data from IMU sensor board 120 that describe the motion of a bowling ball for the purpose of training, drilling, and/or design. The metrics include, for example, the rate of ball revolution ("rev rate") at the time of release (measured in RPM), the speed of the ball center at release (measured in MPH) and the location of the ball angular velocity vector and the ball center velocity relative to the ball. The latter two quantities are extremely important as they determine the direction of the velocity of the point of the ball in contact with the lane and hence the direction of the friction force acting on the ball. The direction of the friction force then dictates how the ball will "hook" as it travels down the lane which is also reported in the tabular data as the "hook potential." The location of the angular velocity vector at release defines the bowler's "axis point" (see coordinates for this point in the table) and knowledge of this axis point is critical to the successful drilling/fitting of a ball to a bowler.

Figure 13:
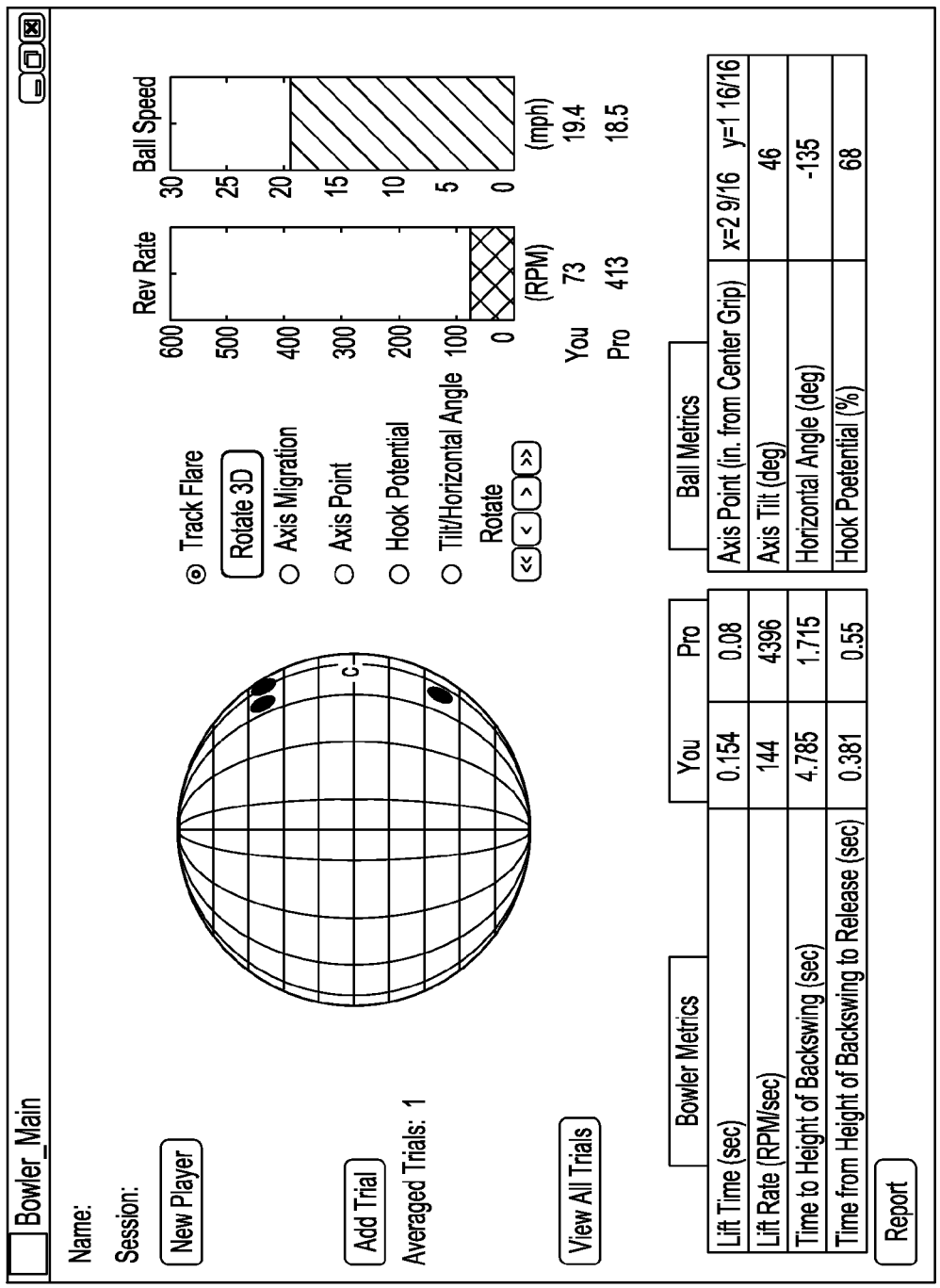
FIG. 13 is a second exemplary metric of ball motion displaying data and calculations derived from the data gathered from the force and moment detection apparatus.

With particular reference to FIG. 13, a graphic is provided that illustrates the "track flare" pattern on the surface of the ball. In essence, the track flare represents the locus of all points on the ball surface that contact the lane. Knowledge of this flare pattern can be used to understand how the bowling ball's spin axis changes (ball precesses) as it travels down the lane.

Free Flight Dynamics

The principles of the present teachings are equally applicable in the determination and calculation of free flight dynamics. Moreover, the present teachings provide methods to distinguish and to analyze free flight dynamics from non-free flight dynamics of sports equipment 114 using the signals generated by inertial sensors 110 attached to or embedded in the sports equipment 114.

Briefly, as discussed herein, prior art covers the use of inertial sensors (e.g., MEMS accelerometers and/or rate gyros) as the means to measure the rigid body dynamics of sports equipment. The sensors, which output signals that are proportional to the acceleration (of a point) and the angular velocity of the moving body of sports equipment, can be used to compute useful kinematic measures of sports equipment motion. Example measures include the velocity and orientation of the head of a golf club, the inclination of a baseball bat in the strike zone, the spin of a bowling ball, the dribble rate of a basket ball, and the like. For many applications, the body of sports equipment may undergo an important transition from non-free flight dynamics to free flight dynamics as in, for example, the case of a baseball being thrown and released by a pitcher's hand. Similar transitions to free-flight arise in nearly all sports employing balls such as football, tennis, golf, bowling, basketball, soccer, volleyball, to name a few examples, as well in other thrown/launched objects such as javelins, discuses, shotputs, arrows, plastic discs (i.e. Frisbee®), etc. In these applications, the transition from non-free flight to free flight is of paramount interest for assessing athletic performance. In other words, skill in these sports in closely associated with achieving the correct "release conditions" as the object begins the free flight phase of motion.

The present teachings go beyond the prior art in that the teachings disclose 1) the means to readily distinguish the transition to free-flight using inertial sensors, 2) the means to analyze free flight dynamics and the release conditions at the start of free flight, 3) the means to do so with a simplified (less expensive) sensor configuration than that proposed in prior art, and 4) the means to correct for sensor drift errors by exploiting the free flight phase of motion.

The present teachings begin with the observation that the forces and moments acting on a body of sports equipment 114 abruptly change during the transition from non-free flight to free flight. For example, the forces and moments acting a bowling ball include 1) the (very large) force/moment system due to the bowler's hand, 2) the weight of the ball, and 3) the (exceedingly small) aerodynamic forces/moments. At the release of the ball, the forces/moments due to the bowler's hand are suddenly eliminated and this leads to large, detectable changes in the ball acceleration and angular velocity measured by embedded accelerometers and angular rate gyros. Following release, the ball is in free-flight and the acceleration of the mass center of the ball will remain constant (and equal to one g) and the angular momentum (hence angular velocity) of the ball will remain constant (assuming the excellent approximation that the weight of the bowling ball dominates the aerodynamics forces/moments). When the bowling ball strikes the lane, very large impact (normal) forces develop that again abruptly alter the measured acceleration and angular velocity via the embedded inertial sensors. Data presented in the following illustrates the abrupt transitions from non-free flight (ball in hand) to free-flight (release of ball and free flight) and back to non-free flight (ball impacts and rolls on lane) that are readily detectable by inertial sensors, how inertial sensors can measure the "release conditions" at the start of free flight and how this information can be used to support bowler training, ball/fitting drilling and ball design. Similar data is presented for an instrumented baseball. These two examples however are only representative of the many applications/sports to which this invention may be applied.

The prior art discloses the use of full six degree of freedom inertial measurement units (IMU's) to deduce the general (three dimensional) rigid body dynamics of moving sports equipment under general conditions without disclosing, teaching or otherwise distinguishing the special features associated with the transition from non-free flight to free-flight dynamics, how to evaluate free flight dynamics, and possible reduction of the sensors employed. For example, the prior art may teach the use of a three axis accelerometer and the simultaneous use of three single axis angular rate gyros all with sense axes aligned with a mutually orthogonal triad of directions attached to the body of equipment. Alternatively, the prior art may teach the use of multiple three axis accelerometers whose number are ultimately sufficient to deduce the full six degrees of freedom of the body of sports equipment (and with redundancies in this case). However, when the objective is to detect and measure the free flight dynamics of sports equipment 114, these prior designs are unduly complex and expensive relative to a simpler form of the invention disclosed below.

The simpler form of the present teachings follows from the fact that, under free flight, we already know the acceleration of one point on the rigid body for "free"; namely the acceleration of the mass center must remain 1 g. This tacitly assumes that the only external force acting during free flight is the weight of the body and this remains an excellent approximation to many bodies of sports equipment 114 whenever weight dominates aerodynamic forces. The new design employs just a single three axis accelerometer (alternatively three single axis accelerometers or one dual axis accelerometer used in conjunction with a single accelerometer) as the means to deduce the entire six degrees of freedom motion of the body without any need or use of angular rate gyros or any additional accelerometers.

Figure 14:
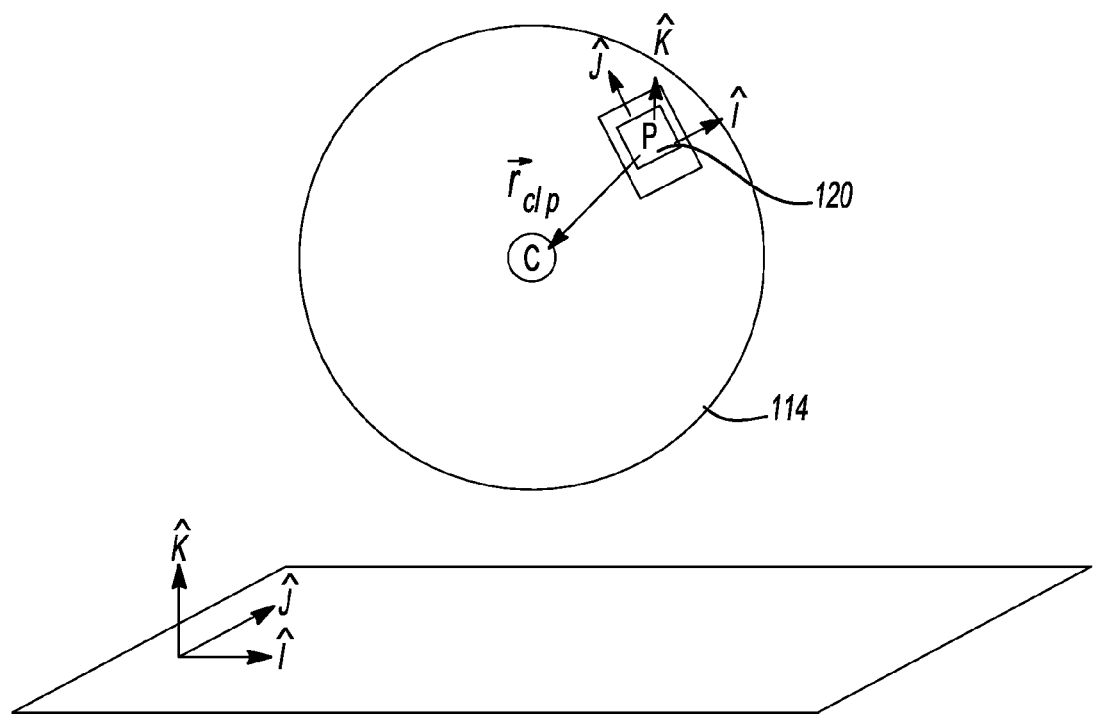
FIG. 14 is a schematic view illustrating a body of sports equipment in free flight with the IMU sensor board thereto.

With reference to FIG. 14, the theory underlying the simpler form rests on the following relation between the acceleration of one point P on a rigid body, where the acceleration is measured, and the acceleration of the mass center C of a rigid body, where the acceleration is known apriori to be 1 g. FIG. 14 illustrates a body of sports equipment 114 in free flight with an embedded IMU sensor board 120 at any convenient location. The accelerometer of IMU sensor board 120 is located at point P and the mass center of the body of sports equipment 114 is located at point C. The (non-inertial) sensor frame of reference is designated by the triad of unit vectors ($\hat{i}$, $\hat{j}$, $\hat{k}$). The (inertial) frame of reference defined by the lab or field of play is designated by the triad of unit vectors ($\hat{I}$, $\hat{J}$, $\hat{K}$). The following equation can be used to determine the acceleration of the point p:

$$\vec{a}_P = \vec{g} + \vec{\omega} \times (\vec{\omega} \times \vec{r}_{p/c}) \quad \text{(Eq. 9)}$$

where, $\vec{a}_p$ denotes the acceleration measured by an accelerometer at point p, $\vec{g}$ represents the known acceleration of the mass center c, $\vec{\omega}$ represents the unknown angular velocity of the body, and $\vec{r}_{p/c}$ represents the known position of p relative to c. (Note that the angular acceleration is presently assumed to vanish during free flight on the assumption that no appreciable aerodynamics moment exists that would otherwise alter the angular momentum of the body. One could also relax this assumption and include the angular acceleration in the above relation as will also be shown in the following. Thus, provided one knows the orientation of gravity $\vec{g}$ relative to the sensor frame of reference, one can reduce Eq. 9 to three algebraic equations for solution of the three components of $\vec{\omega}$. Knowledge of $\vec{\omega}$ then completes the knowledge of the entire six degrees of freedom of the body. This process becomes even simpler when the accelerometer also detects gravity (as is the case with MEMS accelerometers that measure acceleration down to dc) as described next. The important point is that by employing a single (three axis) accelerometer (and not angular rate gyros and/or any additional accelerometers), one can determine all the information needed to analyze the six degree of freedom rigid body motion of a body of sports equipment 114 in free flight.

A further simplification of the above theory results when employing a three-axis accelerometer that is capable of detecting gravity in addition to the acceleration (motion) of a point. Such accelerometers are common. For instance, common MEMS accelerometers (manufactured by Freescale Semiconductor, Analog Devices, Invensense, or Kionix, for example) measure down to dc and therefore detect gravity in addition to the acceleration of a point. For instance, if a MEMS accelerometer were fastened to a stationary table, the measured output of that accelerometer would be given by:

$$\vec{a}_{measured} = g\hat{K} \quad (Eq. 10)$$

Where g represents the local gravitational constant and $\hat{K}$ is a unit vector directed vertically upwards from the surface of the table. Should the table now accelerate with acceleration $\vec{a}$, the measured output of the accelerometer would now change and become $$\vec{a}_{measured} = g\hat{K} + \vec{a} \quad (Eq. 11)$$

Now consider again the case where the accelerometer is mounted on or in a moving body of sports equipment 114 that undergoes a transition to free flight. As in FIG. 14, let the accelerometer be mounted at any convenient point P in the sports equipment 114 and so $$\vec{a}_{measured} = g\hat{K} + \vec{a}_p = g\hat{K} + [-g\hat{K} + \vec{\omega} \times (\vec{\omega} \times \vec{r}_{p/c})] \quad (Eq. 12)$$

Hence the measured output of the accelerometer reduces to $$\vec{a}_{measured} = \vec{\omega} \times (\vec{\omega} \times \vec{r}_{p/c}) \quad (Eq. 13)$$

So in this common instance, the output of the accelerometer alone can be used to immediately deduce the three components of the angular velocity vector $\vec{\omega}$ and without additional knowledge of the orientation of gravity $\vec{g}$ with respect to the sensor frame as previously required above.

To this end, let $(\hat{i}, \hat{j}, \hat{k})$ be a triad of mutually orthogonal unit vectors fixed in the accelerometer and aligned with the three mutually orthogonal sense axes of the accelerometer as illustrated in FIG. 1. Now let $$\vec{\omega} = \omega_x \hat{i} + \omega_y \hat{j} + \omega_z \hat{k} \quad (Eq. 14)$$

represent the unknown angular velocity vector having components)) $(\omega_x, \omega_y, \omega_z)$ along $(\hat{i}, \hat{j}, \hat{k})$, respectively. Similarly, let $$\vec{r}_{p/c} = x\hat{i} + y\hat{j} + z\hat{k} \quad (Eq. 15)$$

be the position vector of point p relative to c having the components (x, y, z) along $(\hat{i}, \hat{j}, \hat{k})$, respectively. Finally, let $$\vec{a}_{measured} = a_x \hat{i} + a_y \hat{j} + a_z \hat{k} \quad (Eq. 16)$$

represent the measured output of the accelerometer having components $(a_x, a_y, a_z)$ along $(\hat{i}, \hat{j}, \hat{k})$, respectively. Substituting Eqs. 14, 15, and 16 into Eq. 13 and expanding into the three associated component (scalar) equations yields the following three algebraic equations for solution of the three unknown angular velocity components $(\omega_x, \omega_y, \omega_z)$:

$$a_x = -x(\omega_y^2 + \omega_z^2) + y\omega_x\omega_y + z\omega_x\omega_z \quad (Eq. 17a)$$

$$a_y = -y(\omega_z^2 + \omega_x^2) + z\omega_y\omega_z + z\omega_y\omega_x \quad (Eq. 17b)$$

$$a_z = -z(\omega_x^2 + \omega_y^2) + x\omega_z\omega_x + y\omega_z\omega_y \quad (Eq. 17c)$$

In summary, due to the special conditions arising during free flight, the measured outputs from a single, three-axis accelerometer $(a_x, a_y, a_z)$ enables one to deduce the three-dimensional angular velocity of a body of sports equipment 114 by simultaneous solution of the three Eqs. 17a, 17b, and 17c. Doing so provides an indirect yet inexpensive means to evaluate the rotational dynamics of a body of sports equipment 114 (e.g. a ball) when in a state of free flight.

Conversely, if one employed solely a three axis rate gyro (or a combination of single or dual axis rate gyros) yielding the three components $(\omega_x, \omega_y, \omega_z)$ of the angular velocity vector, then one can invert the process above and compute the acceleration of any point on the body of sports equipment 114 by evaluating the right-hand sides of Eqs. 17a, 17b, and 17c.

Thus, a single inertial sensor (a three axis accelerometer/equivalent or a three axis rate gyro/equivalent) capable of measuring just three degrees of freedom $((a_x, a_y, a_z)$ or $(\omega_x, \omega_y, \omega_z)$, respectively) can also be employed in IMU sensor board 120 to deduce the remaining (unmeasured) three degrees of freedom of the body of sports equipment 114 via Eqs. 17a, 17b, and 17c when the body is in free flight.

As stated above, one can also relax the assumption of constant angular velocity during free flight and doing so also enables one to consider processional motion when the angular velocity changes during free flight. To this end, consider the generalization of Equation (9) that accounts for the angular acceleration $\vec{\dot{\omega}}$ of the rigid body $$\vec{a}_p = \vec{g} + \vec{\dot{\omega}} \times \vec{r}_{p/c} + \vec{\omega} \times (\vec{\omega} \times \vec{r}_{p/c}) \quad (18)$$

Next, consider the Euler equations that describe time rate of change of the angular momentum for a rigid body in the absence of external torques $$0 = I_c \vec{\dot{\omega}} + \vec{\omega} \times I_c \vec{\omega} \quad (19)$$

in which $I_c$ is the inertia tensor about principal axes through the mass center. Solving Equation (19) for the angular acceleration and then substituting the result into Equation (18) yields $$\vec{a}_p = \vec{g} + [-I_c^{-1}(\vec{\omega} \times I_c \vec{\omega})] \times \vec{r}_{p/c} + \vec{\omega} \times (\vec{\omega} \times \vec{r}_{p/c}) \quad (20)$$

Proceeding as before by noting that the accelerometer measures gravity in addition to the acceleration of point p leads to the final result $$\vec{a}_{measured} = [-I_c^{-1}(\vec{\omega} \times I_c \vec{\omega})] \times \vec{r}_{p/c} + \vec{\omega} \times (\vec{\omega} \times \vec{r}_{p/c}) \quad (21)$$

From Equation (21), one can again readily deduce a set of three algebraic equations relating the components of the measured acceleration to the components of the angular velocity, thus enabling one to deduce the angular velocity (vector) from measurements using a three-axis accelerometer or vice-versa, deduce the acceleration of point p from measurements using a three-axis angular rate gyro. Again, this result generalizes the prior result by capturing the changes to the angular velocity due to precession.

In addition to the uses disclosed above, one can also use the special features of free flight dynamics of sports equipment 114 to correct for drift errors that frequently limit the accuracy of full (six degree of freedom) inertial measurement units (IMU's) that are introduced upon integrating the sensor data. Both accelerometers and angular rate gyros introduce drift errors which, when integrated over a period of time, produce inaccurate predictions of kinematical quantities including velocity, position and orientation (angles). The analysis of the free-flight dynamics of sports equipment 114 however provides constraints on the measured acceleration components $(a_x, a_y, a_z)$ and the measured angular velocity components $(\omega_x, \omega_y, \omega_z)$ in IMU's that enable drift correction as detailed next.

First, integration of the angular velocity components obtained from the angular rate gyros enables one to deduce the orientation of the body of sports equipment 114 with respect to the initial orientation (initial condition for the integration). Refer to FIG. 14 where $(\hat{i}, \hat{j}, \hat{k})$ again represents the orthogonal sensor frame of reference fixed to a body of sports equipment 114 at point P. This frame of reference, which accelerates with point P and spins with the angular velocity of the body of sports equipment 114, is non-inertial. By contrast, consider the inertial frame of reference $(\hat{I}, \hat{J}, \hat{K})$ fixed to the lab or the field of play. The orientation of the moving sensor frame relative to the lab frame is represented by the transformation $$\begin{Bmatrix} \hat{i}(t) \\ \hat{j}(t) \\ \hat{k}(t) \end{Bmatrix} = R(t) \begin{Bmatrix} \hat{I} \\ \hat{J} \\ \hat{K} \end{Bmatrix} \quad \text{(Eq. 22)}$$

in which the rotation matrix $\underline{R}$ is found upon integrating the angular velocity vector measured by the body-fixed angular rate gyros. As a specific example, Euler parameters are used to determine the rotation matrix $\underline{R}$ of a golf club in King et al., "Wireless MEMS Inertial Sensor System for Golf Swing Dynamics," Sensors and Actuators A: Physical, vol. 141, pp. 619-630, 2008. Computation of $\underline{R}$ then enables one to compute the acceleration of the mass center of the body of the body of sports equipment 114 with respect to the inertial frame $(\hat{I}, \hat{J}, \hat{K})$ and then proceed to compute the velocity of the mass center (one integration) and the position of the mass center (a second integration) again with respect to the inertial frame. These integration steps (including the original integration leading to $\underline{R}$) lead to inaccuracies due to sensor drift. To correct for drift, one can exploit the known kinematics of the mass center for a body of sports equipment 114 in free flight. Specifically, the acceleration of the mass center deduced from the measured acceleration and angular velocity is constructed from $$\vec{a}_{c\text{-}constructed} = \vec{a}_p + \vec{\omega} \times (\vec{\omega} \times \vec{r}_{c/p}) = \vec{a}_{measured} + \vec{\omega} \times (\vec{\omega} \times \vec{r}_{c/p}) - g\hat{K} \quad \text{(Eq. 23)}$$

with the resultant vector written with respect to the inertial frame by employing the rotation matrix $\underline{R}$. Due to drift errors, this result will be close to but not equal to the true acceleration of the mass center given by $-g\hat{K}$ (recall that $\hat{K}$ is a unit vector directed positive upwards.) Let the error in the constructed acceleration be given by the vector $$\vec{\epsilon} = \vec{a}_{c\text{-}constructed} + g\hat{K} \quad \text{(Eq. 24)}$$

Then substitution of Eq. 23 into Eq. 24 yields the following expression for the estimated error vector $$\vec{\epsilon} = \vec{a}_{measured} + \vec{\omega} \times (\vec{\omega} \times \vec{r}_{c/p}) \quad \text{(Eq. 25)}$$

wholly in terms of the measured outputs from the three axis accelerometer and angular rate gyro. One can now use Eq. 25 to estimate and correct for the error at any (or multiple) times during the free flight phase of motion of a body of sports equipment 114. Other drift correction algorithms are also possible that exploit the fact that, during free flight, the measured angular velocity and the measured acceleration are not independent as previously shown in Equations 17(a)-(c) and (21).

The above teachings have been reduced to practice in two example applications, namely bowling and baseball, as described next. Again, it is important to emphasize that these are just two illustrative examples, and that the teachings may be readily applied to all other sports or other equipment where the body enters a state of free flight.

As discussed herein, of paramount interest in the sport of bowling are the so-called "rev rate" and "axis point" of the ball as it is released from the bowler's hand. The rev rate is the magnitude of the angular velocity of the ball upon release and it is measured in the units of revolutions per minute (RPM). For instance, professional bowlers frequently achieve rev rates above 350 RPM. The axis point locates the "spin axis" or equivalently the direction of the angular velocity vector on the surface of the ball upon release. More precisely, the axis point is the point on the ball surface where the angular velocity vector pierces the ball (for a right-handed bowler). Taken together, the rev rate and axis point define the magnitude and direction of the angular velocity of the ball as it is released from the bowler's hand. These quantities, together with the release speed of the ball, will determine the degree to which the ball will "hook" in the lane thereafter. (In addition to these release conditions, the hook is also influenced by the oiled lane conditions down the lane). The ability to hook the ball consistently and to control the degree of the hook are the hallmarks of an expert bowler.

Figure 15:
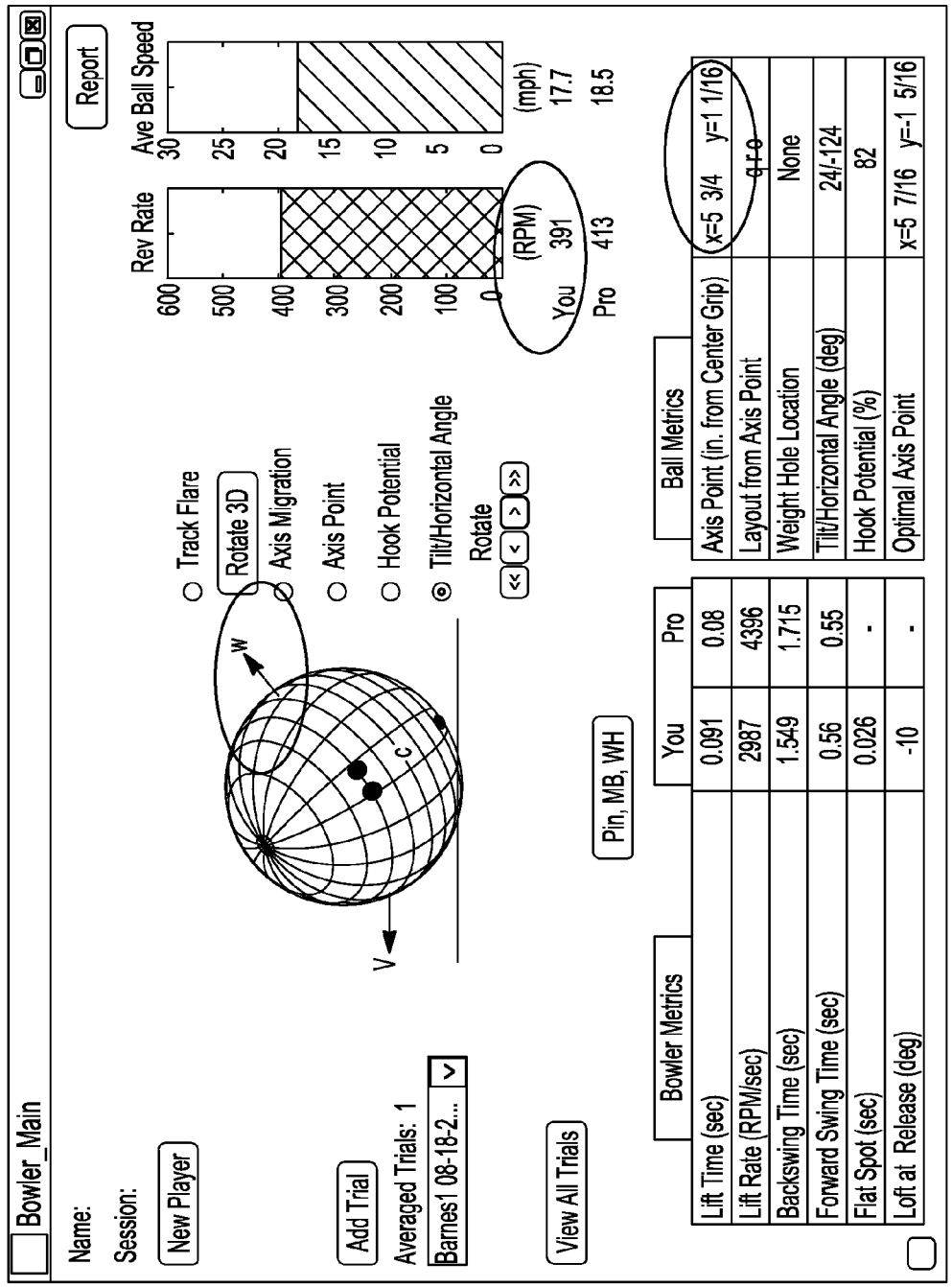
FIG. 15 is a third exemplary metric of ball motion displaying data and calculations derived from the data gathered from the force and moment detection apparatus.

FIG. 15 illustrates several important ball motion "metrics" that are derivable from data from IMU sensor board 120 during the free flight phase of the ball motion from the time the ball is released from the bowler's hand to the time that it impacts the lane. Shown in the Rev Rate bar graph is the bowler's rev rate (391 RPM) and shown in the graphic is the angular velocity vector of the ball $\vec{\omega}$. Again, the latter quantity determines the bowler's axis point—namely the point where the angular velocity vector $\vec{\omega}$ pierces the surface of the bowling ball. The coordinates for the bowler axis point are also provided in the table illustrated in FIG. 15. In this example, the bowler's axis point is located at x=5¾ inches and y=1¹/₁₆ inches where these surface coordinates are measured with respect to an origin located at the center of the grip. Knowledge of the bowler's axis point is extremely important information to be used in laying out how a ball should be drilled. Moreover, the axis point helps the bowler understand how the ball will "react" in the lane due to precession.

Figure 16:
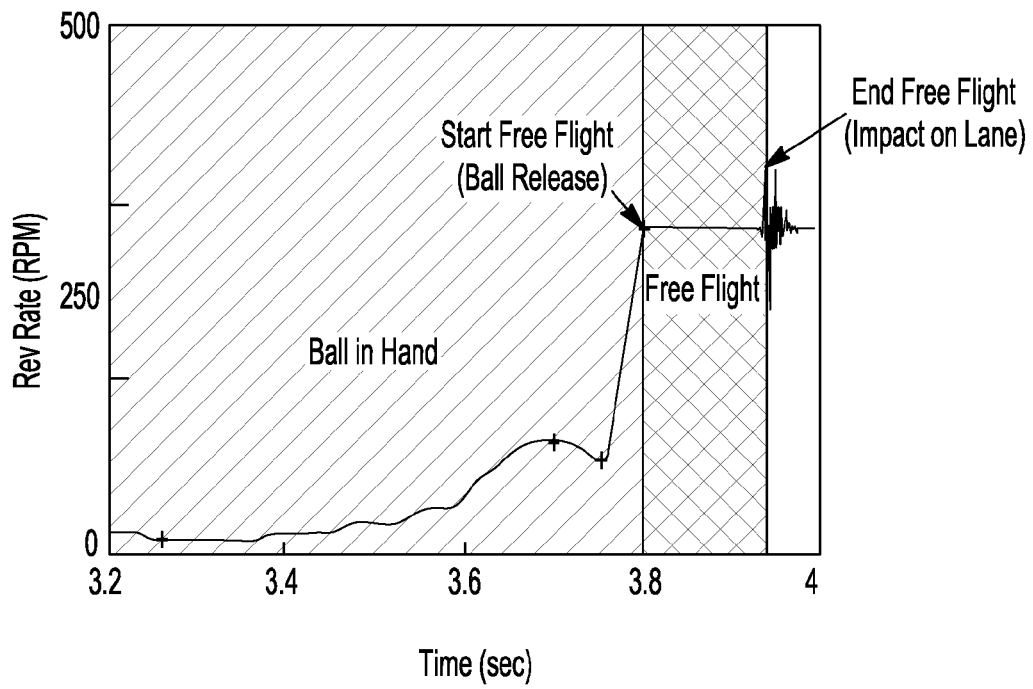
FIG. 16 is a graph illustrating the magnitude of angular velocity and acceleration (of position of accelerometer) as functions of time during the forward swing and release of a bowling ball.

The transition to free flight and then lane impact is readily detectable in the sensor data as illustrated in FIG. 16 for data collected on a bowling ball. FIG. 16 illustrates the magnitude of the angular velocity of the ball (i.e. the ball rev rate) as a function of time. The time period illustrated extends from the start of the bowler's forward swing (ball in hand) through the free flight phase (ball released from hand) and then lane impact as labeled in the figure. At the end of the backswing and the start of the forward swing (time=3.2 sec in figure), the rev rate is close to zero as expected. The rev rate then increases during the forward swing prior to release (time=3.8 seconds in figure). This increase is particularly pronounced in a very short (approximately 50 millisecond) time period just prior to release when the bowler has released the thumb from the thumb hole and is actively "lifting" the ball via the two finger holes (time from 3.75 to 3.8 seconds in figure). The large increase in rev rate during the so-called "lift" is another characteristic of an expert bowler. At the conclusion of the lift, the ball is released and, in the absence of any applied moments, the angular momentum of the ball is conserved. This transition is readily apparent in the suddenly constant (and high) rev rate achieved near the end of this time record and just before the impact on the lane occurs (as seen by the impact-induced spikes in the data at the far right). Thus, the all-important release of the ball into free flight is readily observable in this data. It is equally well observable in the acceleration data as the next example from a baseball clearly shows.

Figure 17:
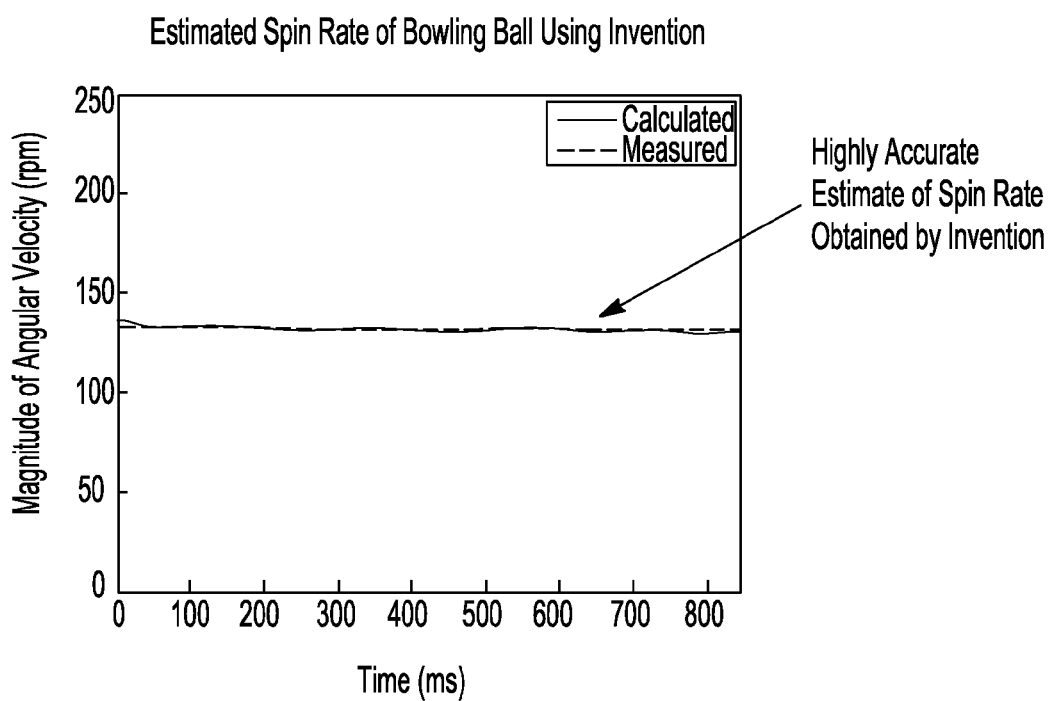
FIG. 17 is a graph contrasting the estimated spin or rev rate of the present teachings employing six measurement degrees of freedom versus three measurement degrees of freedom.

An important part of the present teachings concerns how one can determine the rev rate and axis point from the simplified sensor design (i.e. IMU sensor board 120) described above that employs just one three axis accelerometer (and no angular rate gyros). This simpler sensor may be far less expensive given the relatively higher cost of angular rate gyros. Nevertheless, following the present teachings described herein, this simplified design can provide excellent measures of the rev rate and axis point as demonstrated next in FIG. 17. This figure shows the rev rate for a bowling ball during the free flight phase determined using angular rate gyros (i.e., using all six measurement degrees of freedom of the miniature wireless IMU) versus that obtained using solely the three axis accelerometer (i.e., using just three measurement degrees of freedom of the miniature wireless IMU). In the latter case, the rev rate is computed from the angular velocity components which themselves are computed from the acceleration components per Eqs. 17a, 17b, and 17c (or 21). As is immediately obvious from FIG. 17, the simpler and less expensive sensor provides an outstanding estimate of the actual rev rate over the entire (0.8 second) free flight phase.

Figure 18:
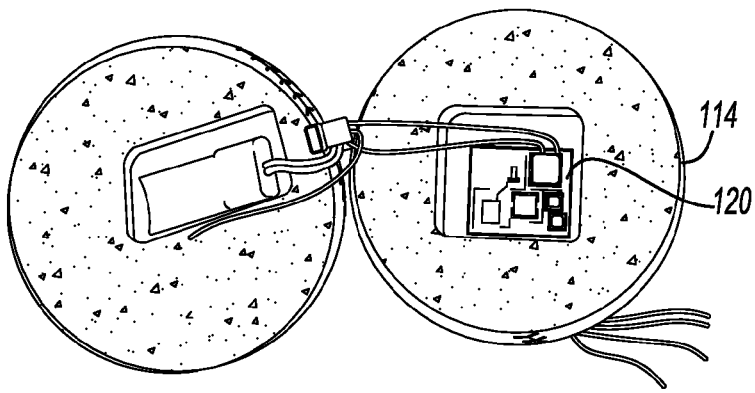
FIGS. 18 and 19 are photographs of an IMU sensor board disposed in an exemplary baseball core collectively operating as the force and moment detection apparatus of the present teachings.
Figure 19:
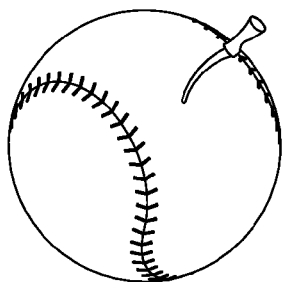

As a second example, consider the photograph of FIG. 18(a) which depicts the interior of an instrumented baseball containing the highly miniaturized, wireless six degree-of-freedom IMU sensor board 120. Again, the novel single-board architecture of IMU sensor board 120 enables one to install the IMU within the small confines of a standard baseball. In this application, small pockets are machined into the two halves of the cork/rubber core of the ball to admit 1) the wireless IMU, 2) a small rechargeable battery, and 3) a small recharging jack. The fully assembled ball is shown in FIG. 18(b) which also depicts a small and removable recharging pin seated in the recharging jack. When the pin is removed, the board is powered by the battery and transmits data from IMU sensor board 120. When the pin is installed as shown, the power to the board is switched off and the battery may then also be charged. When the pin is removed, the power is switched on and IMU sensor board 120 again transmits data. This particular design of a pin for switching and re-charging is but one possible manifestation of switching and recharging functions which can also be done by many other means, including remote means.

When using the full (six measurement degree of freedom) IMU, the data can be used to reconstruct the acceleration, angular acceleration, velocity, angular velocity, position and angular orientation of the ball as functions of time during throwing and free flight. These kinematic measures, and metrics derivable from these, have tremendous potential for use in player/pitcher training for baseball, softball, and any other sport involving the use of sports equipment 114 launched into free flight.

Figure 20:
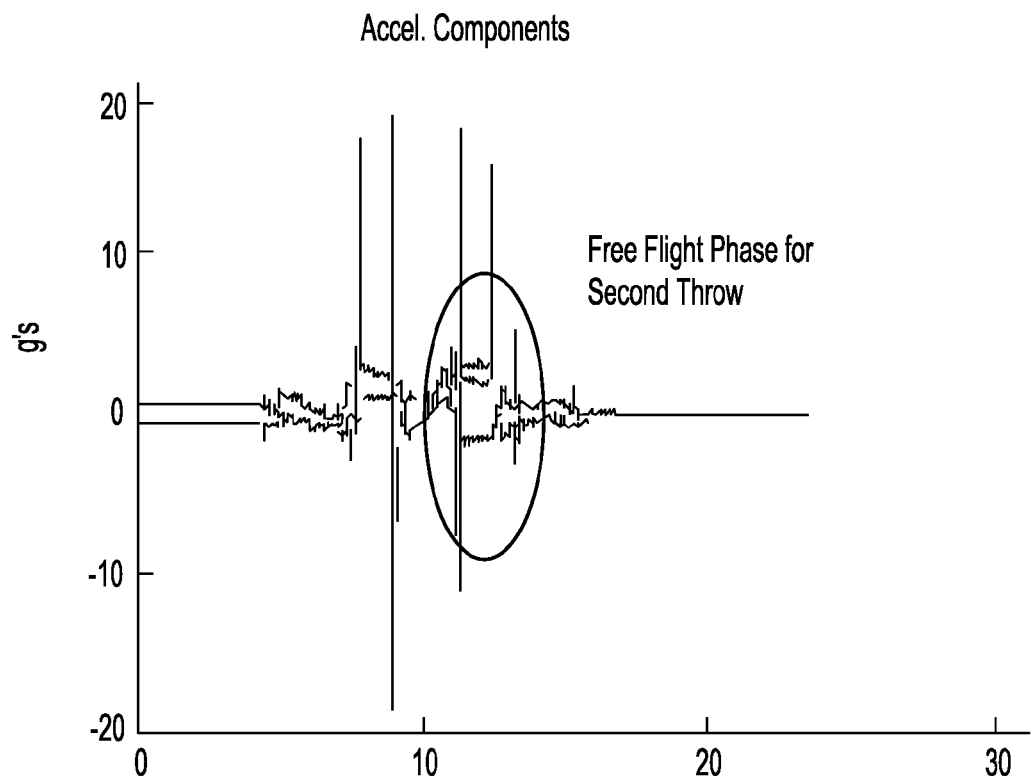
FIG. 20 is a graph illustrating the acceleration of the ball during two throws and catches, including the three acceleration components of the point in the ball coincident with the accelerometer as a function of time.

For instance, the results of FIG. 20 illustrate the acceleration components measured on a ball thrown twice between two players. This information can readily establish the time between a "release" and the subsequent "catch" (and thus one can immediately compute the average speed of the ball during flight). This same data can be used to determine the net force on the ball due to the pitcher's hand, and can also be integrated to determine the velocity and position of the ball. There are many other uses/metrics that can be derived from this data.

Figure 21:
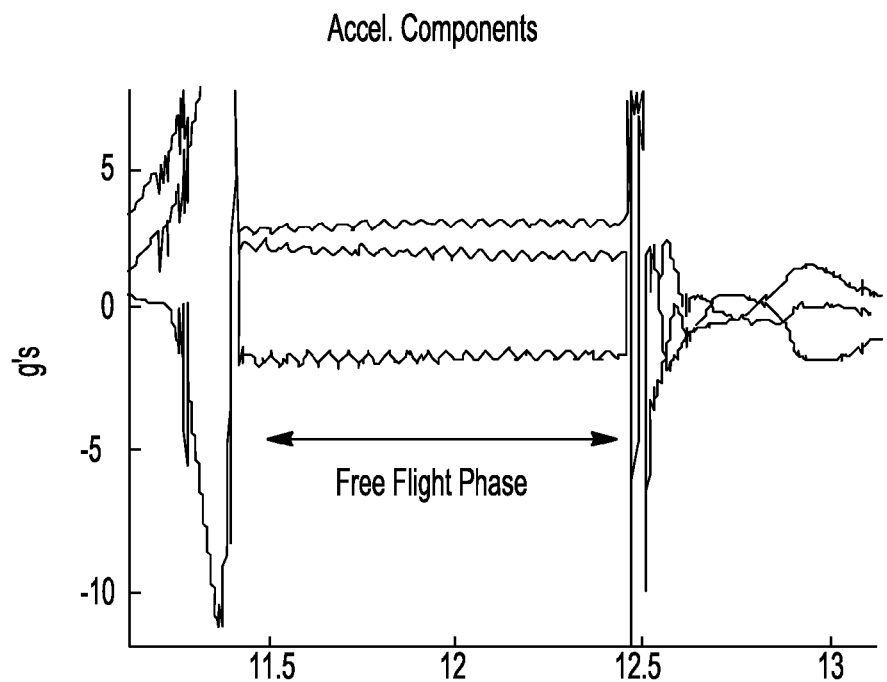
FIG. 21 is an enlarged graph of FIG. 20.

The transition to free flight of a baseball is readily observable in the angular velocity components and/or the acceleration components. As an illustrative example, FIG. 21 is an enlarged view of the acceleration components of FIG. 20 just before, during and just after the second free flight phase. During free flight, these acceleration components maintain near-constant values and this is a striking (i.e., readily detectable) contrast to their rapidly changing values just prior to and just after free flight. This is entirely expected since one can use this data to reproduce the acceleration of the mass center of the baseball and the mass center of the baseball will have an acceleration equal to 1 g downwards during free flight (when also ignoring air drag). Moreover, like in the case of the bowling ball above, these acceleration components can now be used to compute the angular velocity components (via Eqs. 17a, 17b, and 17c or 21) and thus determine the spin rate and spin axis of the ball. Knowledge of ball spin is essential for training and assessing pitcher skill as it is the spin rate and spin axis that distinguishes the major types of pitches (e.g., slider, breaking ball, knuckle ball, fast ball, etc) and the degree to which these pitches are being thrown correctly. Thus the present teachings have significant potential for use as a training aid for pitching due to its ability to quantify the spin rate and spin axis of a baseball at the moment it is released to free flight.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

What is claimed is:

1. An apparatus for analyzing free flight of a body of sports equipment, said apparatus comprising:
    an inertial measurement unit having no more than one accelerometer continuously measuring no more than three acceleration signals representing no more than three orthogonal axes of acceleration and outputting data representative thereof; and
    a processing unit operably receiving said data, said processing unit algebraically computing three components of an angular velocity of the body of sports equipment from said data representative of said measured three orthogonal axes of acceleration.

2. An apparatus for analyzing free flight of a body of sports equipment, said apparatus comprising:
    an inertial measurement unit having one accelerometer continuously measuring three orthogonal axes of acceleration and outputting data representative thereof; and
    a processing unit operably receiving said data, said processing unit computing three components of an angular velocity of the body of sports equipment from said data representative of said measured three orthogonal axes of acceleration, wherein said processing unit calculates said angular velocity ($\omega_x$, $\omega_y$, $\omega_z$) of the body of sports equipment based on simultaneous solution of the equations $$a_x = -x(\omega_y^2 + \omega_z^2) + y\omega_x\omega_y + z\omega_x\omega_z$$

$$a_y = -y(\omega_z^2 + \omega_x^2) + z\omega_y\omega_z + x\omega_y\omega_x$$

$$a_z = -z(\omega_x^2 + \omega_y^2) + x\omega_z\omega_x + y\omega_z\omega_y$$

wherein x, y, z is the position of the mass center of the body of sports equipment relative to the position of said accelerometer and $a_x$, $a_y$, $a_z$ is said measured three orthogonal axes of acceleration from said inertial measurement unit.

3. An apparatus for analyzing free flight of a body of sports equipment, said apparatus comprising:
   an inertial measurement unit having one accelerometer continuously measuring three orthogonal axes of acceleration and outputting data representative thereof; and
   a processing unit operably receiving said data, said processing unit computing three components of an angular velocity of the body of sports equipment from said data representative of said measured three orthogonal axes of acceleration,
   wherein said processing unit calculates said angular velocity ($\omega_x$, $\omega_y$, $\omega_z$) of the body of sports equipment based on simultaneous solution of the measured output of the at least one accelerometer ($\vec{a}_{measured}$)

$$\vec{a}_{measured} = [-I_c^{-1}(\vec{\omega} \times I_c \vec{\omega})] \times \vec{r}_{p/c} + \vec{\omega} \times (\vec{\omega} \times \vec{r}_{p/c})$$

wherein $I_c$ is the inertia tensor about principal axes (x, y, z) through the mass center, c; $\vec{\omega}$ is the angular velocity vector; $\vec{r}_{p/c}$ is the position vector of said accelerometer measured from the mass center, c.

4. The apparatus according to claim 1 wherein said processing unit compensates for errors in said data by comparing a calculated acceleration of a mass center of the body of sports equipment to a predetermined acceleration due to gravity.

5. An apparatus for analyzing free flight of a body of sports equipment, said apparatus comprising:
   an inertial measurement unit having only one accelerometer measuring acceleration using no more than three acceleration signals along no more than three rigid body degrees of freedom and outputting data representative thereof; and
   a processing unit operably receiving said data, said processing unit outputting six rigid body degrees of freedom of the body of sports equipment during free flight in response to algebraically calculating angular velocity based on said data representative of said acceleration measured along said three rigid body degrees of freedom.

6. The apparatus according to claim 5 wherein said accelerometer comprises a three-axis accelerometer.

* * * * *